(12) United States Patent
Yamaguchi

(10) Patent No.: US 6,747,548 B1
(45) Date of Patent: Jun. 8, 2004

(54) NON-CONTACT IC CARD SYSTEM AND NON-CONTACT IC CARD

(75) Inventor: Atsuo Yamaguchi, Hyogo (JP)

(73) Assignees: Mitsubishi Denki Kabushiki Kaisha, Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 0 days.

(21) Appl. No.: 09/445,589

(22) PCT Filed: Jun. 18, 1997

(86) PCT No.: PCT/JP97/02092

§ 371 (c)(1),
(2), (4) Date: Mar. 21, 2000

(87) PCT Pub. No.: WO98/58347

PCT Pub. Date: Dec. 23, 1998

(51) Int. Cl.⁷ .................... H04Q 5/22; G08B 13/14
(52) U.S. Cl. ............ 340/10.51; 340/10.1; 340/10.34; 340/572.1; 340/572.6; 340/572.7
(58) Field of Search ............ 340/10.51, 572.1, 340/10.34, 10.1, 572.6, 572.7

(56) References Cited

U.S. PATENT DOCUMENTS

| | | | | |
|---|---|---|---|---|
| 3,689,885 A | * | 9/1972 | Kaplan et al. | 235/382.5 |
| 4,551,712 A | * | 11/1985 | Fockens | 340/10.1 |
| 4,924,171 A | * | 5/1990 | Baba et al. | 235/380 |
| 5,113,184 A | * | 5/1992 | Katayama | 235/491 |
| 5,257,011 A | * | 10/1993 | Beigel | 370/278 |
| 5,345,231 A | * | 9/1994 | Koo et al. | 235/449 |
| 5,440,302 A | * | 8/1995 | Irmer et al. | 235/380 |
| 5,491,468 A | * | 2/1996 | Everett et al. | 340/10.42 |
| 5,519,729 A | * | 5/1996 | Jurisch et al. | 340/10.34 |
| 5,585,617 A | * | 12/1996 | Ohbuchi et al. | 235/491 |
| 5,838,235 A | * | 11/1998 | Thorigne | 235/493 |

FOREIGN PATENT DOCUMENTS

| | | |
|---|---|---|
| JP | 4-192091 A | 7/1992 |
| JP | 696300 | 4/1994 |
| JP | 757067 | 3/1995 |
| JP | 7-264091 A | 10/1995 |
| JP | 7296127 | 11/1995 |
| JP | 8228205 | 9/1996 |
| JP | 962816 | 3/1997 |
| JP | 973524 | 3/1997 |
| JP | 981701 | 3/1997 |

\* cited by examiner

Primary Examiner—Brian Zimmerman
Assistant Examiner—Clara Yang
(74) Attorney, Agent, or Firm—Birch, Stewart, Kolasch & Birch, LLP

(57) ABSTRACT

A non-contact IC card system capable of improving the data transmission rate and communication range without considerably enlarging the frequency band of a signal to be put to use. An AM-modulated signal (1F) from a reader writer (200) is received by a resonance circuit (6) of an IC card (100), and an IC card driving power source is produced therefrom in a rectifying section (8). In addition, it is demodulated in an AM demodulating circuit (10) and decoded in a decoder (13), thereby presenting reception data (10). On the other hand, when data (1J) is transmitted from the IC card (100), a characteristic of a regulator (9) for stabilizing an operating voltage of the resonance circuit (6) is altered on the basis of a signal encoded in an encoder (11) so that the signal is transmitted as an AM-modulated signal (1P) to the reader writer (200).

4 Claims, 36 Drawing Sheets

NON-CONTACT IC CARD SYSTEM AND NON-CONTACT IC CARD

This application is the national phase under 35 U.S.C. § 371 of PCT International Application No. PCT/JP97/02092 which has an International filing date of Jun. 18, 1997, which designated the United States of America.

TECHNICAL FIELD

The present invention relates to a non-contact IC card system including a non-contact IC card using electromagnetic induction but not having a battery, and to a non-contact IC card.

BACKGROUND ART

FIG. 36 illustrates a configuration of this type of conventional non-contact IC card system. In this illustration, numeral 80 designates a non-contact IC card (which will be referred to hereinafter as a card) not containing a battery, while numeral 70 denotes a reader writer (which will be referred to hereinafter as an R/W).

In the card 80, numeral 81 represents an antenna resonance circuit constituting a parallel resonance circuit using an antenna coil 81a and a capacitor 81b, numeral 82 depicts a rectifying circuit comprising rectifying devices 82a and 82b, and numeral 83 signifies an energy storing circuit made up of energy storing capacitors 83a and 83b for storing energy after rectification. FIG. 36 shows an example of full-wave voltage doubler rectifying circuits.

Numeral 84 designates a comparator for detecting the fact that a voltage after rectification exceeds a predetermined value, and numeral 84a signifies a reference power supply for producing the aforesaid predetermined value. In addition, numeral 85 depicts a variable resistive device comprising, for example, an MOSFET transistor and connected in parallel to the antenna resonance circuit 81. This variable resistive device 85, when the comparator 84 detects that the voltage after the rectification exceeds the predetermined value, alters a quality factor Q of the antenna resonance circuit 81 in proportion to the exceeding or extra quantity from the predetermined value.

Numerals 86a and 86b represent output transistors, respectively, numeral 87 designates a transistor drive circuit to be described later, numeral 88 denotes a driver taking an operating condition by a control signal 88a at transmission, and numeral 89 indicates a resistor connected to the output side of this driver.

Numeral 90a depicts a high-potential side level comparator for detecting the fact that the high-potential side amplitude level of the antenna resonance circuit 4 exceeds a predetermined value (for example, Vcc), numeral 90b denotes a low-potential side level comparator for detecting the fact that the low-potential side amplitude level of the antenna resonance circuit 81 falls below a predetermined value (for example, GND), numeral 90c signifies an intermediate level comparator for detecting whether the antenna resonance circuit 81 is above or below a predetermined value (for example, ½ Vcc), numeral 91 means a control section, and numeral 92 designates a memory section for data storage.

Meanwhile, in the R/W 70, numeral 71 represents a transmission antenna resonance circuit comprising an antenna coil 71a and a capacitor 71b to constitute a series resonance circuit, numeral 72 denotes a power transmission adjusting resistor for adjusting the magnitude of the power transmission from the R/W 70, numeral 73 depicts a driver, and numeral 74 indicates a modulating circuit comprising an EX-OR circuit, connected to the input side of this driver 73 and made to receive data 74a and a carrier 74b.

Numeral 75 represents a reception antenna resonance circuit comprising an antenna coil 75a and a capacitor 75b, constituting a parallel resonance circuit, numeral 76 denotes an amplifying circuit for amplifying a signal received, and numeral 77 depicts a demodulating circuit.

Since the power supply varies depending upon the distance between R/W 70 and the card 80, for absorbing this variation, on the card 80 side, the quality factor Q of the antenna resonance circuit 81 is altered on the basis of the voltage after the rectification, thereby stabilizing the voltage induced in the card 80.

When the comparator 84 makes a decision that the voltage after the rectification exceeds the predetermined value, the variable resistive device 85 adjusts the quality factor Q of the antenna resonance circuit 81 so that the quality factor Q decreases correspondingly to the exceeding quantity from the predetermined value. Furthermore, the decrease of Q causes the adjustment of the reception voltage, which leads to the stabilization of the voltage, to be induced in the card 80, against the variation of the distance between the R/W 70 and the card 80.

In addition, a modulation system for data transmission from the card 80 to the R/W 70 also requires less consumption of energy. For this reason, a modulation is made by varying the constant of the antenna resonance circuit 81. A phase modulation system is realized in a manner that the constant of the antenna resonance circuit 81 is changed correspondingly to the variation of data to be transmitted.

In the case of the phase modulation system, the transistor drive circuit 87 generates a 180° pulse lasting for a period of a phase of 180° when the output data varies. This 180° period is determined from the output of the intermediate level comparator 90c.

Furthermore, in a manner that the output transistor 86a conducts ON/OFF operation in accordance with this 180° pulse, the connection/disconnection of the output capacitor 86b to/from the antenna resonance circuit 81 is accomplished so that the resonance frequency of the antenna resonance circuit 81 varies with the variation of data. The connection of the output capacitor 86b to the antenna resonance circuit 81 causes the variation of the circuit constant of the antenna resonance circuit 81.

FIG. 37 is a waveform illustration for explaining the operation. In FIG. 37, (a) indicates data, (b) indicates a carrier, (c) shows a waveform after phase modulation, (d) shows a signal (180° pulse) to the base of the transistor 86a at the phase modulation, (e) illustrates a waveform after frequency modulation which will be described later, and (f) illustrates a signal to the base of the transistor 86a when the frequency modulation is conducted.

As shown in (a) to (d) of FIG. 37, when the variation of the output data takes place (variation from an H level to a L level and from the L level to the H level), the frequency is changed for a period of 180° and, assuming that this frequency is ½ of the original frequency, the two-phase modulation is realized.

That is, as shown in (c) of FIG. 37, the signal after the phase modulation turns in frequency to ½ for the period of 180° from the variation of data, that is, the period between A and B and the period between C and D, whereupon the phase inverts for the period between B and C.

In addition, taking the phase into consideration rather than the output of the intermediate level comparator 90c, if the output transistor 86a is turned ON/OFF in accordance with the variation itself of the output data from the control section 91, as shown in (e) and (f) of FIG. 37, the frequency modulation is conducted such that the frequency becomes ½.

Still additionally, as another approach, there has been a system in which the output transistor 86a is connected between both the ends of the resonance circuit 81 and both the ends of the resonance circuit 81 is short-circuited at a varying point of the output data for the period of 180° to compulsively invert the phase for the PSK modulation, thereby accomplishing high-speed data transmission.

In the above-described conventional non-contact IC card system, the power transmission has been made from the R/W to the card, while the data transmission has been performed in a manner that its power carrier is PSK (Phase Shift Keying)-modulated in accordance with data.

In such a system, if an approach is taken to achieve the improvement of the data transmission rate and the improvement of the communication range simultaneously, since the range of the variation of the frequency of signal to be put to use is wide, the frequency band also becomes wide. Further, since a restriction is imposed according to the wireless telegraphy act, which may be different for every nation, a problem has arisen, for example, in achieving a system which functions to universally achieve the same purpose.

Accordingly, it is an object of the present invention to provide a non-contact IC card system and a non-contact IC card which are capable of improving the data transmission rate and communication range without considerably broadening the frequency band of a signal to be put to use.

DISCLOSURE OF THE INVENTION

This invention provides a non-contact IC card system including an R/W and a non-contact IC card, characterized in that the non-contact IC card comprises a regulator connected to both ends of a resonance circuit having an oscillation frequency identical with a frequency of a power transmission carrier for conducting reception of power and data from the R/W and transmission of data to the R/W, with the regulator stabilizing an operating voltage in the resonance circuit, and switching its characteristic in accordance with transmission data to produce a load variation for conducting data transmission by an AM modulation.

Furthermore, this invention provides a non-contact IC card system including an R/W and a non-contact IC card, characterized in that the non-contact IC card comprises a regulator connected to both ends of a resonance circuit having an oscillation frequency identical with a frequency of a power transmission carrier for conducting reception of power and data from the R/W and transmission of data to the R/W, with the regulator adjusting a voltage across the resonance circuit and giving a directionality in accordance with transmission data in adjusting the voltage across the resonance circuit to conduct data transmission at a frequency different from the power transmission carrier, while the R/W comprises a data reception resonance circuit having a resonance frequency matching with a frequency for the data transmission from the card.

Still furthermore, this invention offers the non-contact IC card system according to claim 2, characterized in that the regulator includes an adjusting section for adjusting the voltage across the resonance circuit and a pair of directionality designating sections for giving a directionality to this adjustment, and the pair of directionality designating sections are alternately operated in accordance with the transmission data so that the directionality is given to the adjustment, while the pair of directionality designating sections are operated simultaneously in accordance with the transmission data so that data transmission is conducted by an AM modulation.

In addition, this invention offers the non-contact IC card system according to claim 2, characterized in that the non-contact IC card further comprises an additional data transmission resonance circuit having an oscillation frequency matching with a frequency for the data transmission, and this data transmission resonance circuit conducts data transmission by obtaining transmission power from electromagnetic coupling with the resonance circuit having the oscillation frequency identical with the power transmission carrier.

Moreover, this invention provides a non-contact IC card system including an R/W and a non-contact IC card, characterized in that the R/W comprises a transmission resonance circuit having a resonance frequency matching with a frequency of a power transmission carrier for conducting power transmission and data transmission and a data reception resonance circuit having a resonance frequency matching with a frequency for data transmission from the non-contact IC card, while the non-contact IC card comprises a reception resonance circuit having a resonance frequency matching with a frequency of the power transmission carrier for conducting reception of power and data from the R/W, a resonance circuit for data transmission to the R/W, having a resonance frequency different from the frequency of the power transmission carrier, and a driver connected to the data transmission resonance circuit and driven by a signal having a lower duty ratio than a transmission carrier for data transmission.

Furthermore, this invention provides a non-contact IC card system including an R/W and a non-contact IC card, characterized in that the R/W comprises a transmission resonance circuit having a resonance frequency matching with a frequency of a power transmission carrier for conducting power transmission and data transmission and a data reception resonance circuit having a resonance frequency matching with a frequency for data transmission from the non-contact IC card, while the non-contact IC card comprises a reception resonance circuit having a resonance frequency matching with a frequency of the power transmission carrier for conducting reception of power and data from the R/W and a data transmission resonance circuit having a resonance frequency different from the frequency of the power transmission carrier and made to obtain transmission power from electromagnetic coupling with the reception resonance circuit.

Still furthermore, this invention provides a non-contact IC card system including an R/W and a non-contact IC card, characterized in that the R/W comprises a transmission resonance circuit having a resonance frequency matching with a frequency of a power transmission carrier for power transmission and a data transmission/reception resonance circuit having a resonance frequency matching with a frequency for data transmission/reception to/from the non-contact IC card, while the non-contact IC card comprises a reception resonance circuit having a resonance frequency matching with the frequency of the power transmission carrier for conducting reception of power from the R/W and a data transmission/reception resonance circuit having a resonance frequency different from the frequency of the power transmission carrier for conducting data transmission/reception to/from the R/W.

Still furthermore, this invention provides a non-contact IC card system including an R/W and a non-contact IC card, characterized in that at least one of the R/W and the non-contact IC card comprises an AM demodulating circuit for converting a reception signal being a carrier AM-modulated by transmission data into a binary signal by comparing the reception signal with a reference value and further for detecting the transmission data by comparing a pulse width of the converted binary signal with a width of a reference pulse feedbacked to vary in accordance with a variation of the pulse width of the converted binary signal.

Still furthermore, this invention provides a non-contact IC card system including an R/W and a non-contact IC card, characterized in that at least one of the R/W and the non-contact IC card comprises a filter for converting a reception signal including a plurality of carriers different in frequency from each other into a binary signal by comparing the reception signal with a reference value and further for extracting a carrier with a desired frequency by comparing a pulse width of the converted binary signal with a width of a reference pulse feedbacked to vary in accordance with a variation of the pulse width of the converted binary signal.

In addition, this invention offers the non-contact IC card system according to any one of claims 1 to 4, characterized by comprising a sub-carrier producing section for dividing a power transmission carrier from the R/W to the non-contact IC card to produce a sub-carrier having a different frequency, with the sub-carrier being modulated by transmission data.

Moreover, this invention provides a non-contact IC card which receives power supply from an R/W and conducts data transmission/reception to/from the R/W, characterized by comprising a regulator connected to both ends of a resonance circuit having an oscillation frequency identical with a frequency of a power transmission carrier for conducting reception of power and data from the R/W and transmission of data to the R/W, with the regulator stabilizing an operating voltage of the resonance circuit and switching its characteristic in accordance with transmission data to generate a load variation so that data transmission is conducted by an AM modulation.

Furthermore, this invention provides a non-contact IC card which receives power supply from an R/W and conducts data transmission/reception to/from the R/W, characterized by comprising a regulator connected to both ends of a resonance circuit having a resonance frequency identical with a frequency of a power transmission carrier for conducting reception of power and data from the R/W and transmission of data to the R/W, with the regulator adjusting a voltage across the resonance circuit and giving a directionality according to transmission data in adjusting the voltage across the resonance circuit to conduct data transmission at a frequency different from the power transmission carrier.

In addition, this invention offers the non-contact IC card, characterized in that the regulator includes an adjusting section for adjusting the voltage across the resonance circuit and a pair of directionality designating sections for giving a directionality to this adjustment, and the pair of directionality designating sections are alternately operated in accordance with the transmission data so that the directionality is given to the adjustment, while the pair of directionality designating sections are operated simultaneously in accordance with the transmission data so that data transmission is conducted by an AM modulation.

Still additionally, this invention offers the non-contact IC card, characterized by further comprising an additional data transmission resonance circuit having an oscillation frequency matching with a frequency for the data transmission, and this data transmission resonance circuit conducts data transmission by obtaining transmission power from electromagnetic coupling with the resonance circuit having the oscillation frequency identical with the power transmission carrier.

Furthermore, this invention provides a non-contact IC card which receives power supply from an R/W and conducts data transmission/reception to/from the R/W, characterized by comprising a reception resonance circuit having a resonance frequency matching with a frequency of a power transmission carrier for conducting reception of power and data from the R/W, a resonance circuit for data transmission to the R/W, having a resonance frequency different from the frequency of the power transmission carrier, and a driver connected to the data transmission resonance circuit and driven by a signal having a lower duty ratio than a transmission carrier for data transmission.

Still furthermore, this invention provides a non-contact IC card which receives power supply from an R/W and conducts data transmission/reception to/from the R/W, characterized by comprising a reception resonance circuit having a resonance frequency matching with a frequency of a power transmission carrier for conducting reception of power and data from the R/W and a data transmission resonance circuit having a resonance frequency different from the frequency of the power transmission carrier and made to obtain transmission power from electromagnetic coupling with the reception resonance circuit.

Still furthermore, this invention provides a non-contact IC card which receives power supply from an R/W and conducts data transmission/reception to/from the R/W, characterized by comprising a reception resonance circuit having a resonance frequency matching with a frequency of a power transmission carrier for reception of power from the R/W and a data transmission/reception resonance circuit having a resonance frequency matching with a frequency for data transmission/reception different from the frequency of the power transmission carrier for conducting data transmission/reception to/from the R/W.

Still furthermore, this invention provides a non-contact IC card which receives power supply from an R/W and conducts data transmission/reception to/from the R/W, characterized by comprising an AM demodulating circuit for converting a reception signal being a carrier AM-modulated by transmission data into a binary signal by comparing the reception signal with a reference value and further for detecting the transmission data by comparing a pulse width of the converted binary signal with a width of a reference pulse feedbacked to vary in accordance with a variation of the pulse width of the converted binary signal.

Still furthermore, this invention provides a non-contact IC card which receives power supply from an R/W and conducts data transmission/reception to/from the R/W, characterized by comprising a filter for converting a reception signal including a plurality of carriers different in frequency from each other into a binary signal by comparing the reception signal with a reference value and further for extracting a carrier with a desired frequency by comparing a pulse width of the converted binary signal with a width of a reference pulse feedbacked to vary in accordance with a variation of the pulse width of the converted binary signal.

Besides, this invention offers the non-contact IC card according to any one of claims 1 to 4, characterized by comprising a sub-carrier producing section for dividing a power transmission carrier from the R/W to the non-contact IC card to produce a sub-carrier having a different frequency, with the sub-carrier being modulated by transmission data.

BEST MODE FOR CARRYING OUT THE INVENTION

Embodiment 1

This embodiment is for performing the two-way data transmission from an R/W 200 to a card 100 and from the card 100 to the R/W 200 through the use of a power transmission carrier from the R/W 200 side to the card 100. Particularly, on the card side, an AM modulation is made by switching the performance of a regulator, which is for adjusting a voltage across a card side resonance circuit, in accordance with transmission data, that is, by varying a load.

Figure 1:
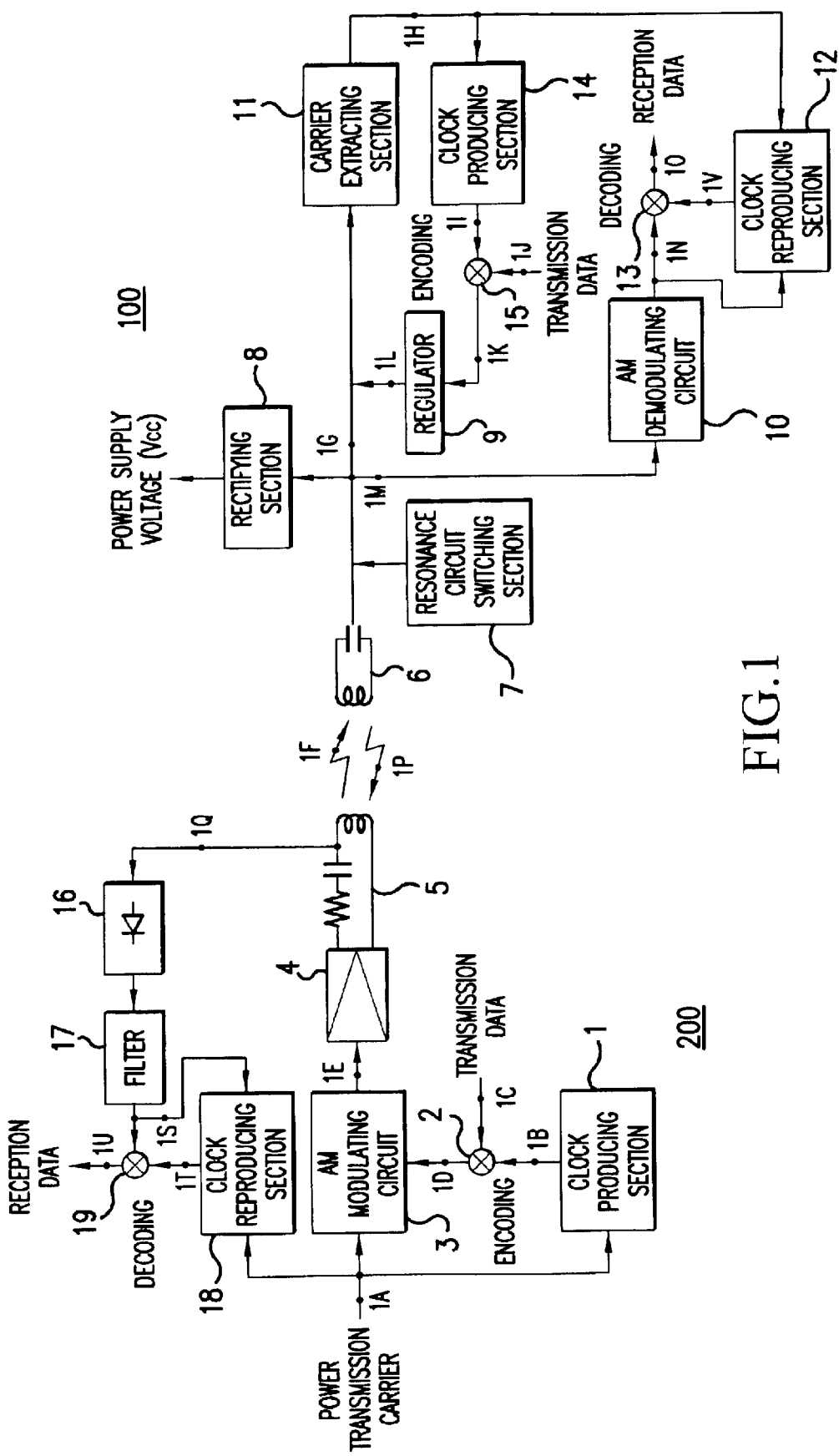
FIG. 1 is an illustration of a configuration of a non-contact IC card system according to an embodiment of this invention.
Figure 6:
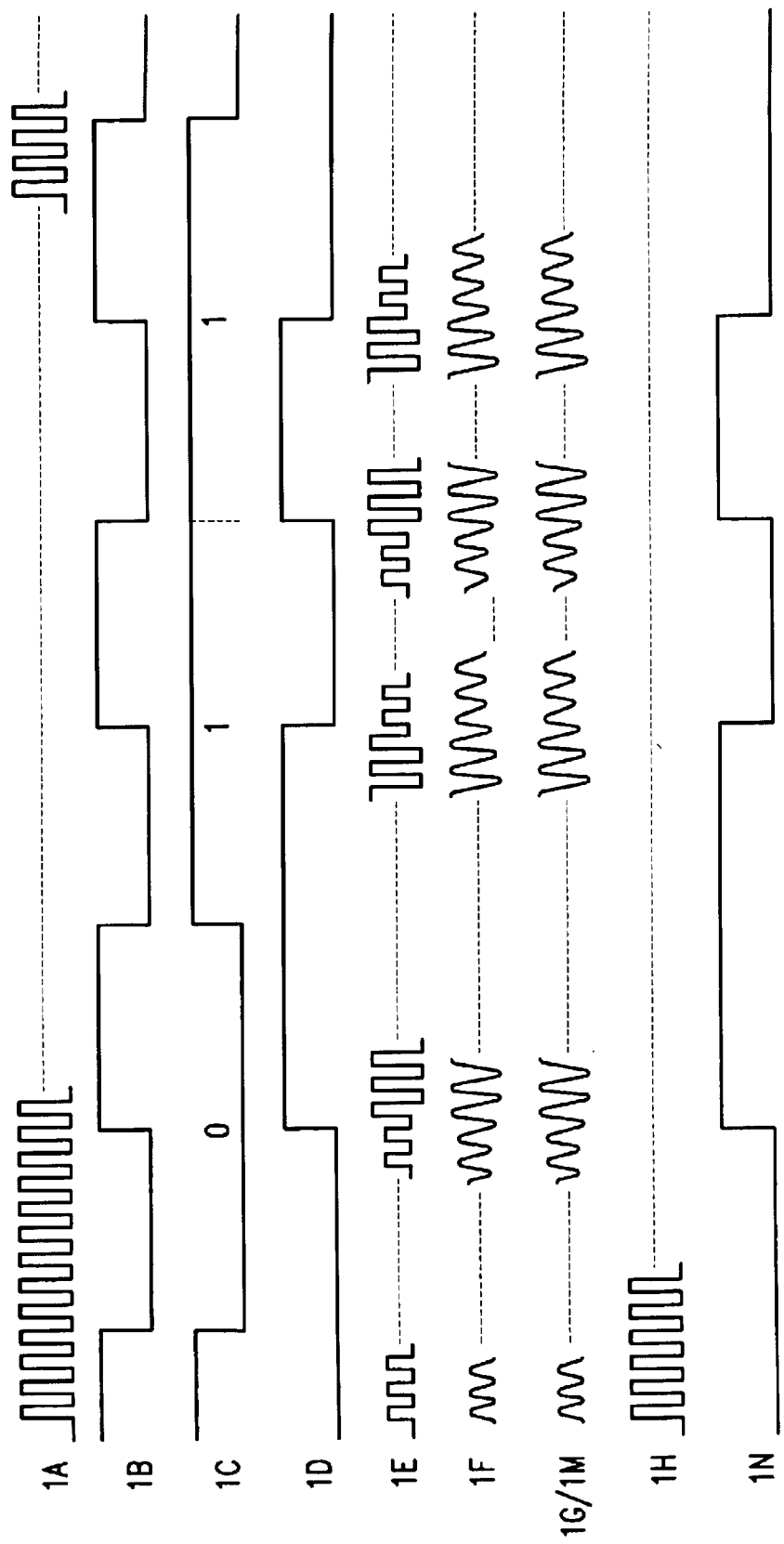
FIG. 6 is an illustration of waveforms appearing at parts of the system in FIG. 1.
Figure 7:
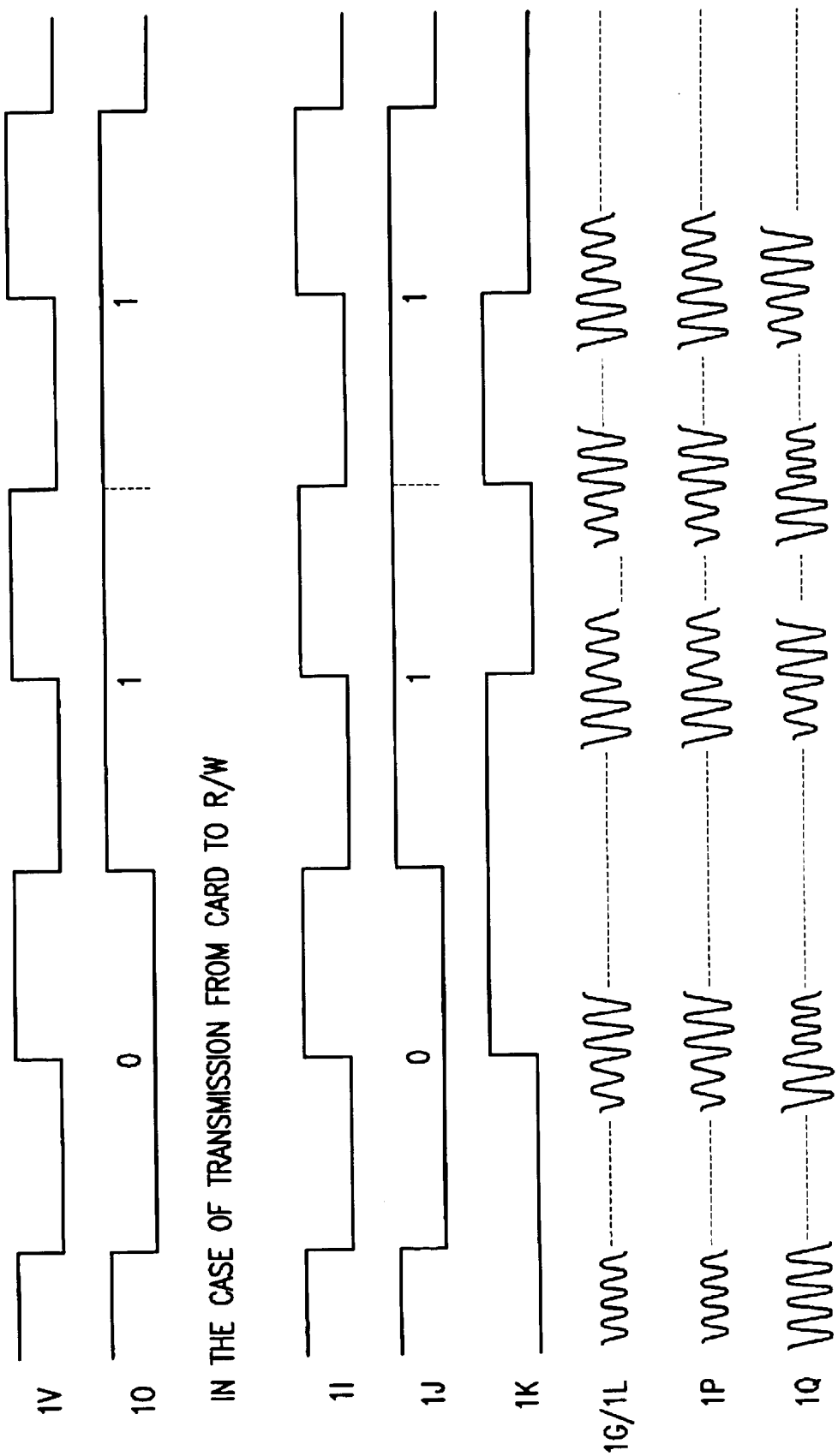
FIG. 7 is an illustration of waveforms appearing at parts of the system in FIG. 1.
Figure 8:
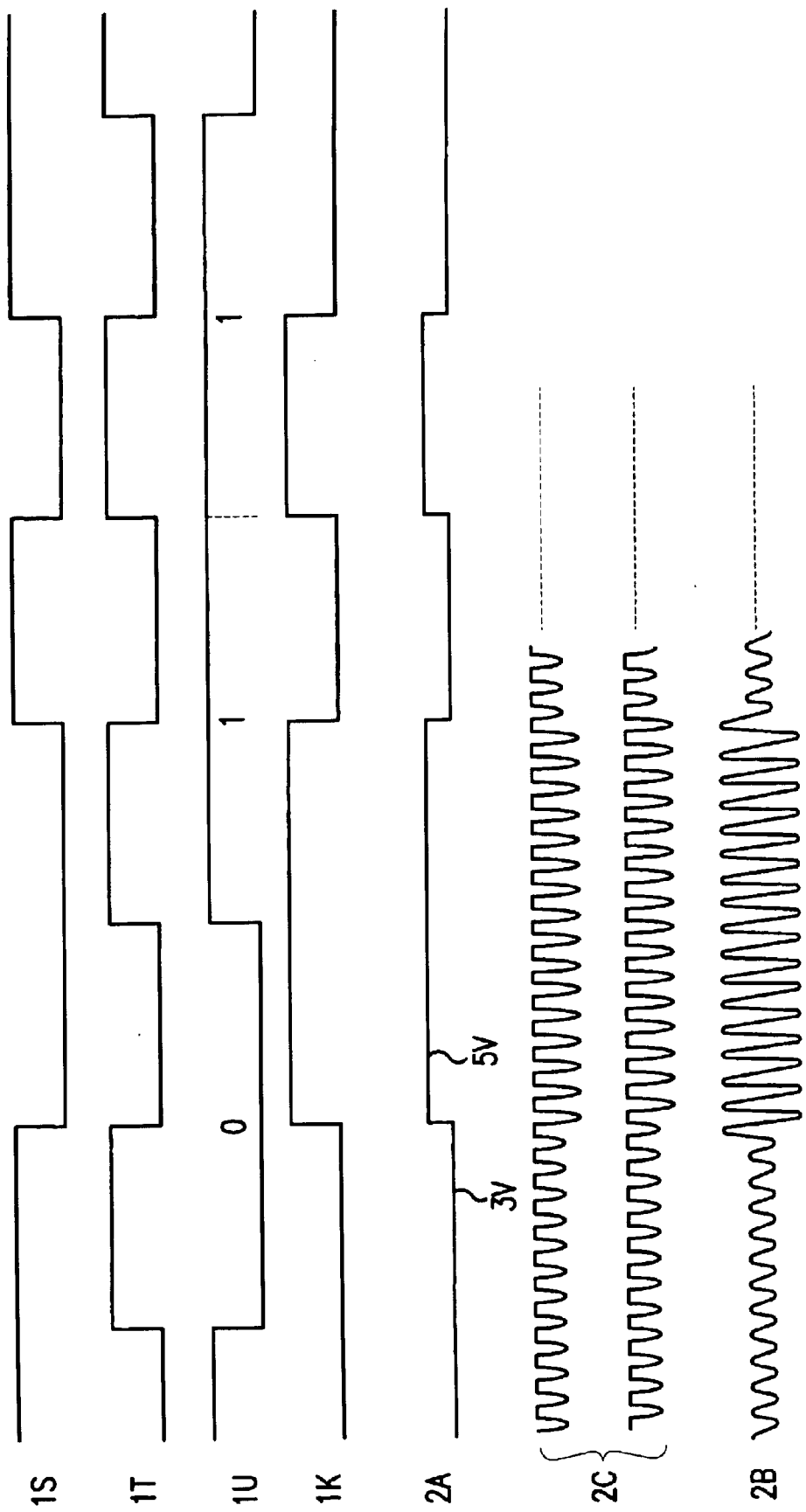
FIG. 8 is an illustration of waveforms appearing at parts of the system in FIG. 1 and at parts of the regulator in FIG. 2.

FIG. 1 shows a configuration of a non-contact IC card system according to an embodiment of this invention, which includes a reader/writer (R/W) 200 and a non-contact IC card 100. In the R/W 200, numeral 1 designates a clock producing section, numeral 2 represents an encoder, numeral 3 denotes an AM modulating circuit, numeral 4 depicts a driver, numeral 5 signifies a resonance circuit, numeral 16 indicates an AM detector, numeral 17 shows a filter, numeral 18 means a clock reproducing section, and numeral 19 stands for a decoder. Furthermore, in the non-contact IC card 100, numeral 6 designates a resonance circuit, numeral 7 represents a resonance circuit switching section, numeral 8 denotes a rectifying section, numeral 9 depicts a regulator, numeral 10 indicates an AM demodulating circuit, numeral 11 shows a carrier extracting section, numeral 12 signifies a clock reproducing section, numeral 13 represents a decoder, numeral 14 designates a clock producing section, and numeral 15 stands for an encoder. In addition, in the illustration, signal waveforms at parts indicated at 1A to 1V are shown in FIGS. 6 to 8.

In this embodiment, for the power transmission from the R/W 200 to the card 100, on the R/W 200 side, a modulation of a power transmission carrier (1A) is made on the basis of data, which will be described later, in the AM modulating circuit 3, and the driver 4 drives the resonance circuit 5 in accordance with a signal (1E) thus modulated. On the card 100 side, the resonance circuit 6 receives power from a signal indicated by a waveform 1F, the resonance circuit switching section 7 switches the connecting direction in accordance with the polarity of the resonance circuit 6, the rectifying section 8 obtains an operating voltage forming a power supply voltage Vcc, and the regulator 9 stabilizes the operating voltage. Besides, the power transmission from the card 100 to the R/W 200 is unnecessary.

For the data transmission from the R/W 200 to the card 100, the clock producing section 1 produces, from the power transmission carrier (1A), a data transmission clock (1B) having a frequency being, for example, ¹⁄₁₆ of the power transmission carrier (1A), while the encoder 2 encodes (1D) transmission data (1C) by performing the exclusive OR (EXOR) with the data transmission clock (1B). In addition, the AM modulating circuit 3 AM-modulates (1E) the aforesaid power transmission carrier (1A) with the encoded transmission data (1D), and the drivers 4 drives the resonance circuit 5 in accordance with the AM-modulated signal.

For the data reception on the card 100 side, the AM demodulating circuit 10 demodulates (1N) the AM modulation (1G, 1M) appearing in the resonance circuit 6. Additionally, the carrier extracting section 11 extracts a carrier (1H) from a power wave appearing in the resonance circuit 6, while the clock reproducing section 12 perform a clock reproduction from this carrier (1H) and the demodulated wave (1N). Still additionally, the decoder 13 performs the decoding (the reverse operation of the aforesaid encoding) of the demodulated wave (1N) on the basis of a clock (1V), thereby providing data (1O).

On the other hand, for the data transmission from the card 100 to the R/W 200 side, the clock producing section 14 produces a clock (1I) from the data transmission carrier (1H) extracted in the carrier extracting section 11, while, as well as the R/W side, the encoder 15 encodes (1K) transmission data (1J) by performing the exclusive OR (EXOR) with the clock (1I). Furthermore, the voltage of the resonance circuit 6 is changed in a manner that the characteristic of the regulator 9 is altered with the encoded transmission data (1K), thus transmitting the data.

In the data reception on the R/W 200 side, the AM detector 16 AM-detects a variation (1Q) of the amplitude in the resonance circuit 6 appearing in the resonance circuit 5, and the filter 17 removes (1S) the direct-current component and the carrier component. Additionally, the clock reproducing section 18 reproduces a clock (1T) from the output signal (1S) of this filter 17 and the power transmission carrier (1A), while the decoder 19 decodes (1U) the signal (1S) on the basis of the c lock 1T), thereby fetching the data.

Figure 2:
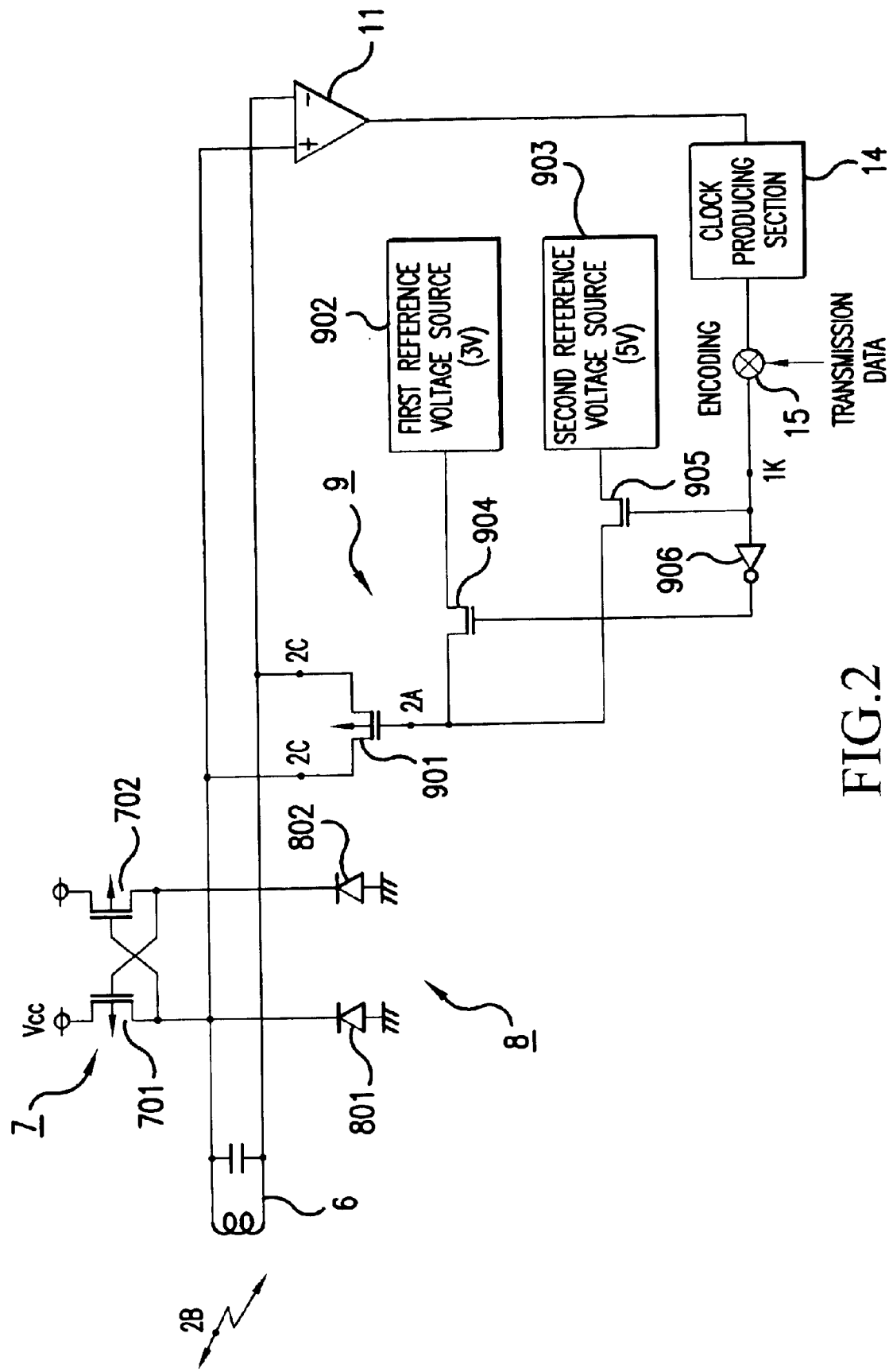
FIG. 2 is an illustration of one example of a regulator in FIG. 1.

FIG. 2 illustrates one example of the regulator in FIG. 1, where a reference voltage itself is switched in accordance with data. In FIG. 2, numerals 801 and 802 represent diodes constituting the rectifying section 8, and numerals 701 and 702 designate P-channel transistors organizing the resonance circuit switching section 7. The switching by the resonance circuit switching section 7 and the rectification by the rectifying section 8 create a voltage, bridge-rectified, across the resonance circuit 6.

The regulator 9 is made up of a P-channel transistor 901 for adjusting a voltage across the resonance circuit 6, first and second reference voltage sources 902 and 903 for giving first and second reference voltages, for example, 3V and 5V, different from each other, N-channel transistors 904 and 905 for performing the switching between these voltages in accordance with the encoded transmission data (1K) to supply the voltage, selected by the switching, to the gate of the transistor 901, and an inverter 906. Besides the first and second reference voltage sources 902 and 903 are attained from the power supply voltage Vcc.

Furthermore, FIG. 8 shows signal waveforms at 2A to 2C in the illustration. In addition, FIG. 4 illustrates the operating characteristics, indicated at A and B, for when 3V and 5V are applied to the transistor 901.

Figure 4:
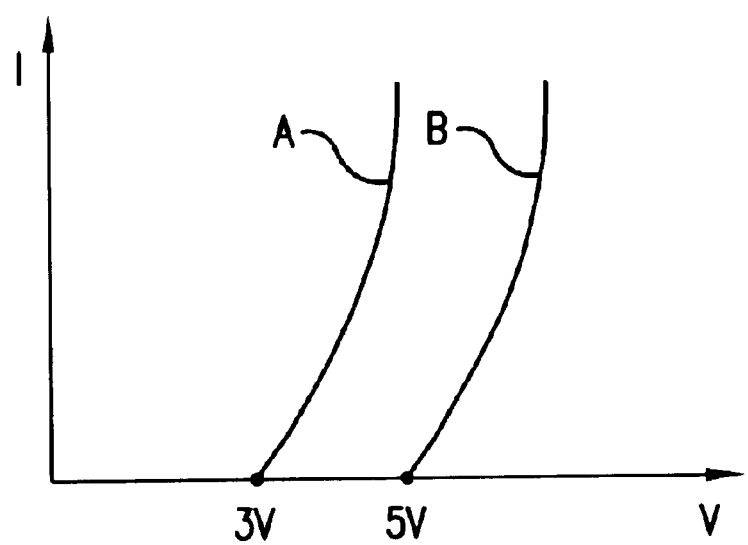
FIG. 4 is an illustration for explaining an operating characteristic of the regulator in FIG. 2.

Because the voltage to be applied to the transistor 901 is switched in accordance with the encoded transmission data, the characteristic of the transistor 901 is switched between A and B in FIG. 4; hence, while the voltage of the resonance circuit 6 is adjusted, its amplitude is switched according to the transmission data as shown in 2B in FIG. 8, and the data transmission is accomplished.

Figure 3:
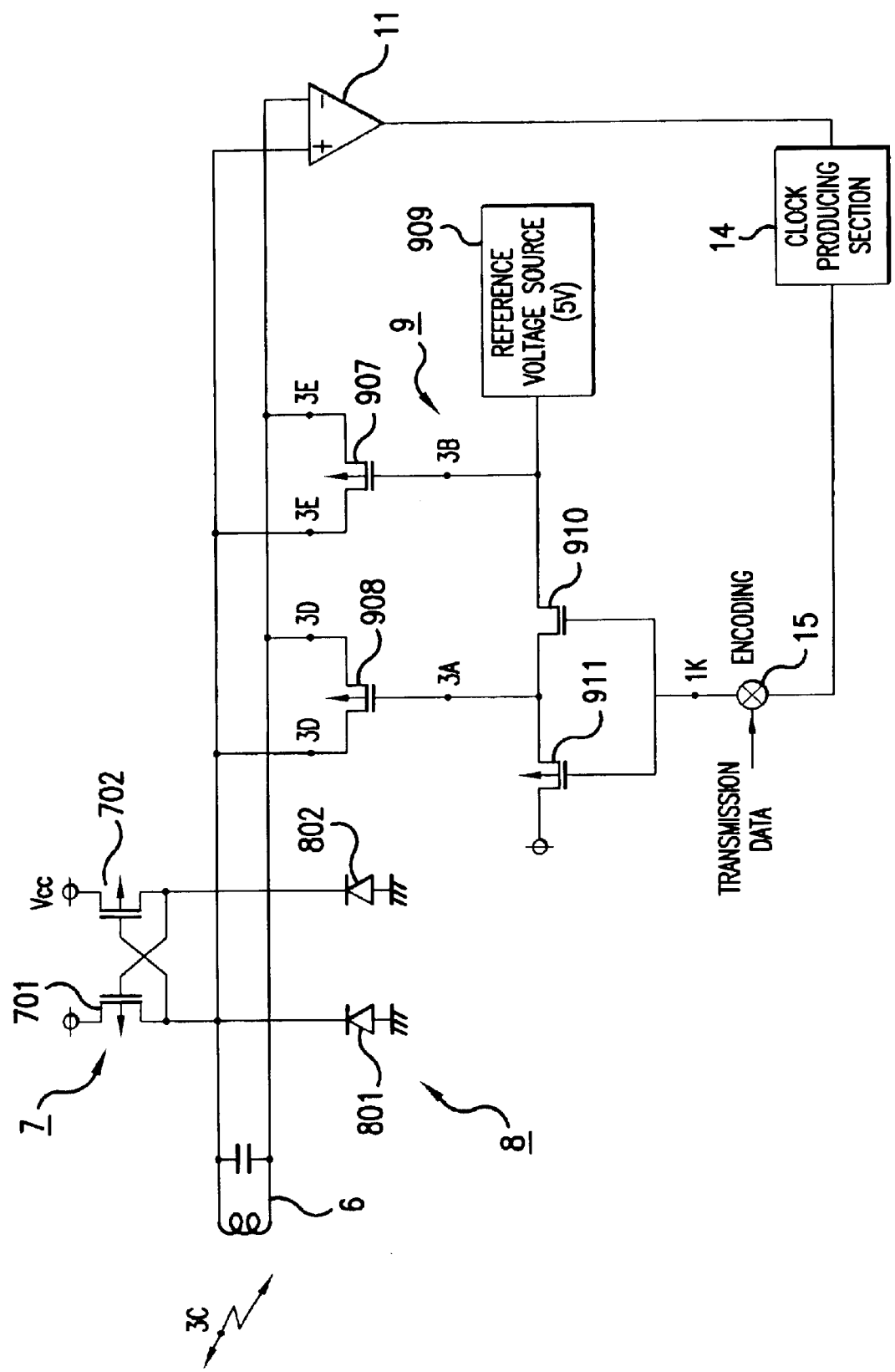
FIG. 3 is an illustration of another example of the regulator in FIG. 1.

FIG. 3 shows one example of increasing/decreasing the ability of the regulator 9 in accordance with data. In FIG. 3, the regulator 9 is made up of two P-channel transistors 907 and 908 for the adjustment of a voltage across the resonance circuit 6, a reference voltage source 909, for example, presenting 5V, and an N-channel transistor 910 and a P-channel transistor 911 for supplying a voltage to operate the transistor 907 forming one of the adjustment transistors at all times while switching the other transistor 908 between the activation/deactivation in accordance with the encoded transmission data (1K).

Figure 5:
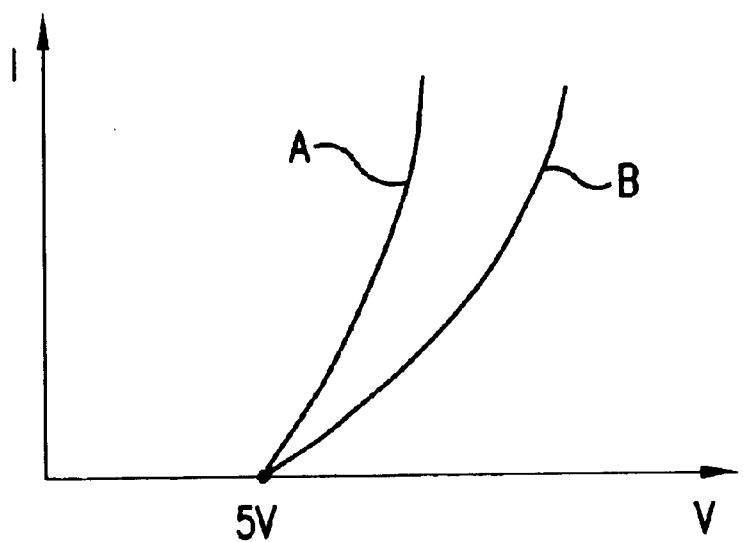
FIG. 5 is an illustration for explaining an operating characteristic of the regulator in FIG. 3.
Figure 9:
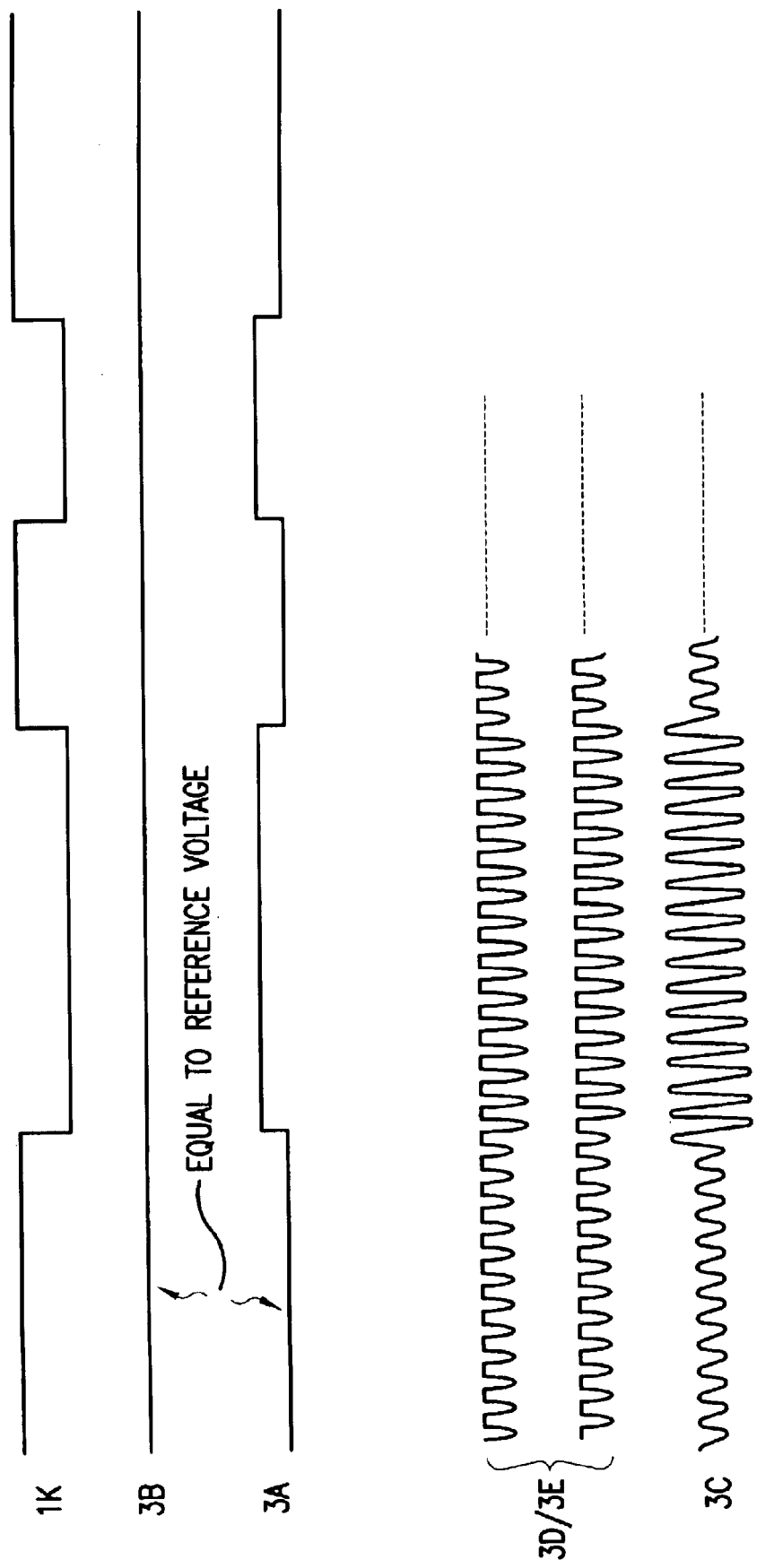
FIG. 9 is an illustration of waveforms appearing at parts of the regulator in FIG. 3.

FIG. 9 shows signal waveforms at 3A to 3E in the illustration, and FIG. 5 shows the operating characteristics, indicated at A and B, for when one transistor is used for the adjustment and for when two transistors are employed therefor.

The transistor 907 is always in an operating condition, and the transistor 908 switches between the activation/deactivation according to the encoded transmission data, so that the characteristic of the regulator 9 due to the combination of the two transistors 907 and 908 switches between A and B in FIG. 5; thus, while the voltage of the resonance circuit 6 is adjusted, its amplitude is switched according to the transmission data as shown in 3C of FIG. 9, thereby accomplishing the data transmission.

According, the switching of the performance of the regulator 9 depending upon the transmission data can realize the data transmission between the card and the R/W by the AM modulation based upon the use of the same frequency in the transmission and reception.

Embodiment 2

A difference from the embodiment 1 is that, for the data transmission from a card to an R/W, the transmission is made through the use of a frequency different from that of a power wave. Additionally, a data reception resonance circuit having a resonance frequency fitted to a frequency from the data transmission from the card to the R/W is provided separately on the R/W side and one resonance circuit is provided in the card.

Figure 10:
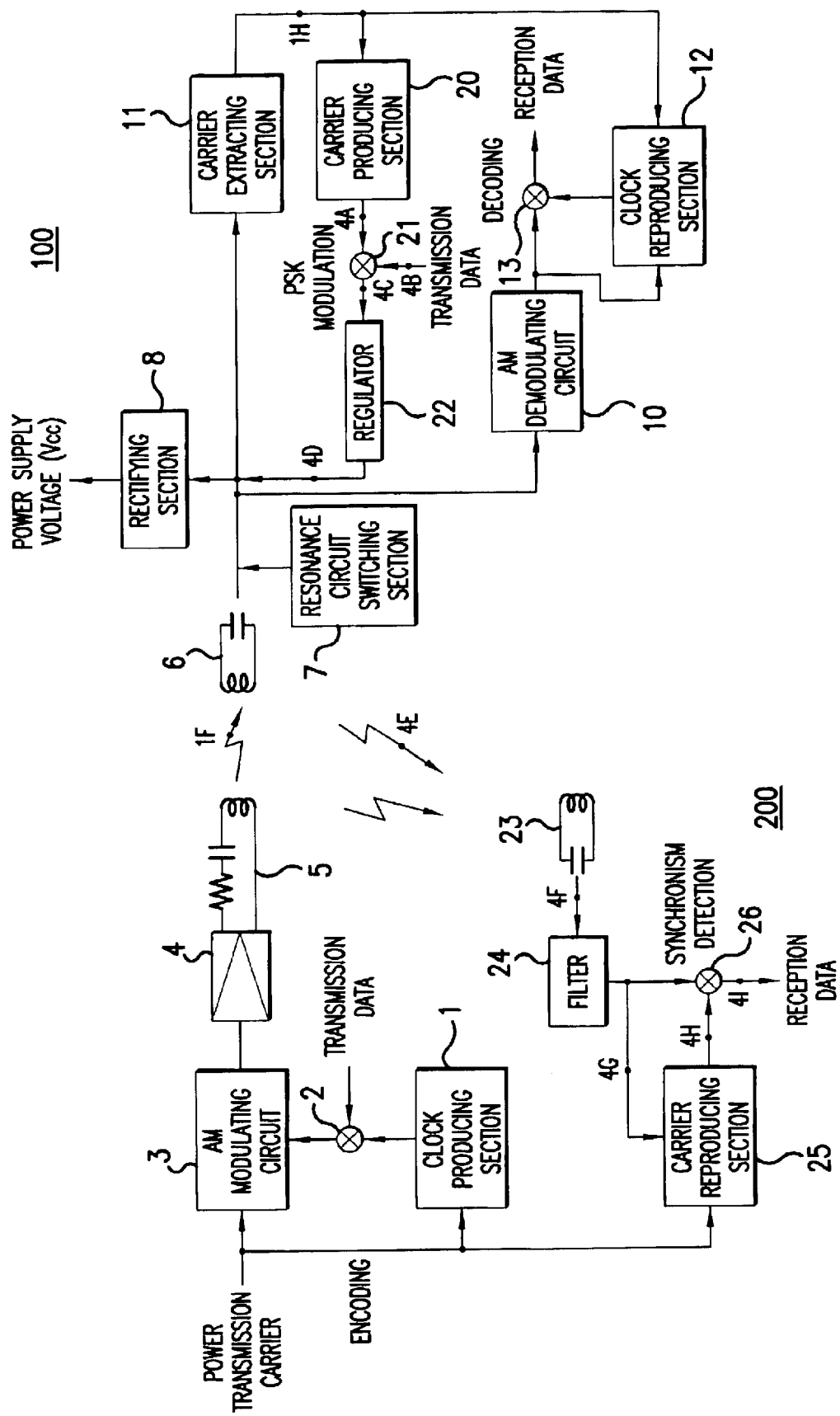
FIG. 10 is an illustration of a configuration of a system according to an embodiment 2 of this invention.
Figure 12:
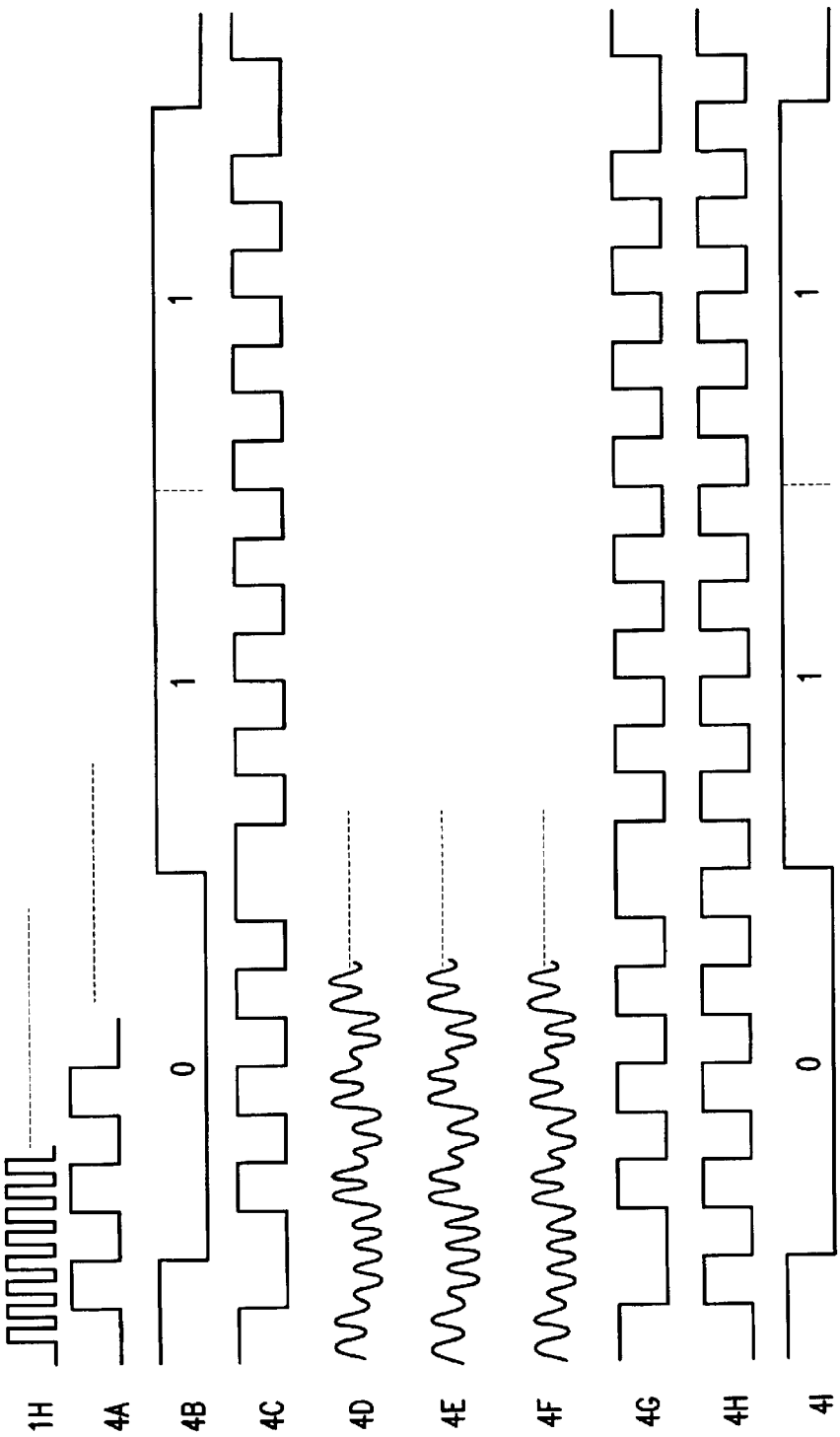
FIG. 12 is an illustration of waveforms appearing at parts of the system in FIG. 10.

FIG. 10 shows a configuration of a non-contact IC card system according to another embodiment of this invention, which includes a reader/writer (R/W) 200 and a non-contact IC card 100. Parts identical or corresponding to those in the above-described embodiment are marked with the same numerals (and so forth). In the R/W 200, numeral 23 signifies a data reception resonance circuit, numeral 24 indicates a filter and numeral 25 depicts a carrier reproducing section. Meanwhile, in the card 100, numeral 20 represents a carrier producing section, numeral 21 denotes a PSK (Phase Shift Keying) modulator and numeral 22 stands for a regulator. FIG. 12 shows signal waveforms at 4A to 4I in the illustration.

The difference from the embodiment 1 is that, in the data transmission from the card 100 to the R/W 200, the transmission is made through the use of a frequency (for example, ¼ frequency) different from the power wave. In addition, a data reception resonance circuit is placed separately on the R/W side and the card 100 employs one resonance circuit 6.

The power transmission and the data transmission from the R/W to the card side are the same as those in the embodiment 1. For the data transmission on the card 100 side, the carrier producing section 20 produces a transmission carrier (4A) having a frequency, for example, ¼ of the carrier (1H), on the basis of the power carrier (1H) extracted in the carrier extracting section 11, while the PSK modulator 21 PSK-modulates transmission data (4B). A directionality is given (4D) to a current, the regulator 22 regulates, in accordance with the modulated transmission carrier (4C), and a transmission carrier (4E) having a frequency different from the power carrier is generated from the resonance circuit 6.

On the R/W 200 side, a transmission carrier including transmission data from the card 100 is received by the data reception resonance circuit 23 whose frequency is fitted to this transmission carrier, and the incoming power wave from the resonance circuit 5 is removed (4G) in the filter 24. Additionally, the carrier reproducing section 25 produces a carrier (4H) identical with the carrier from the card 100, and a synchronism detector 26, for example, demodulates the PSK-modulation reception data through a synchronism detection to present reception data (4I).

Figure 11:
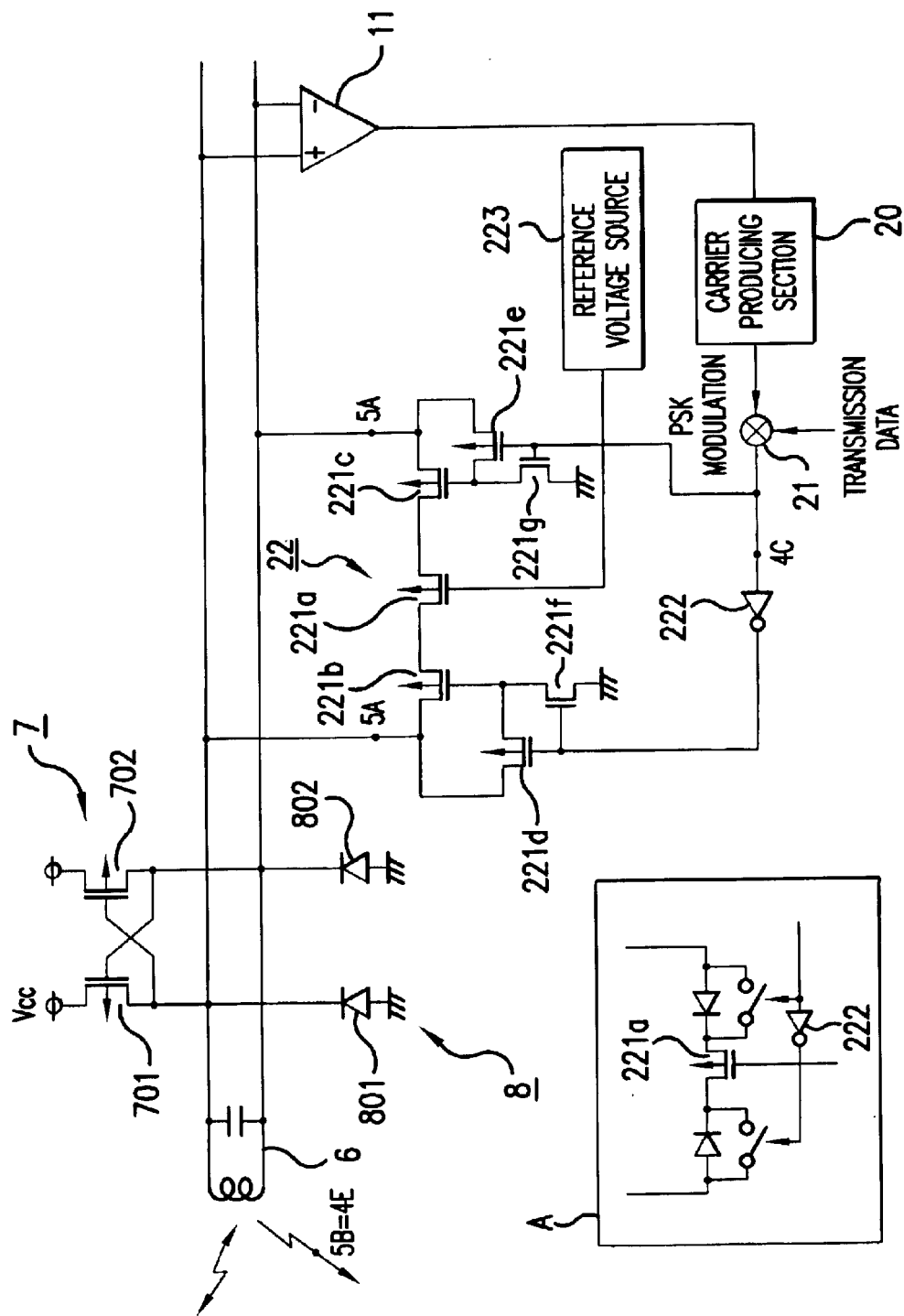
FIG. 11 is an illustration of one example of the regulator in FIG. 10.

FIG. 11 shows one example of the regulator 22 in FIG. 10. This regulator 22 is for giving a directionality to a current, flowing in the regulator, according to transmission data. In the regulator 22, a P-channel transistor 221a is a transistor for adjusting a voltage across the resonance circuit 6, while P-channel transistors 221b to 221e, N-channel transistors 221f, 221g and an inverter 222 are circuits for giving a directionality to a current flowing in the transistor 221a, that is, in the regulator 22, according to transmission data. A reference voltage source 223 is a voltage source for the transistor 221a, which is obtainable from a power supply voltage Vcc.

Figure 13:
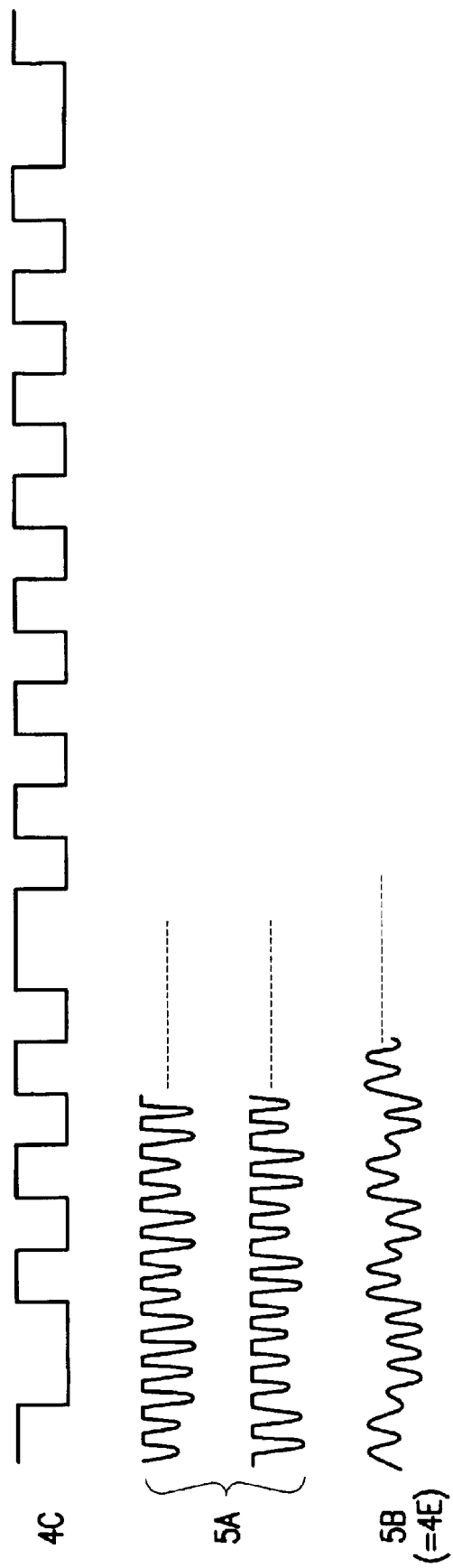
FIG. 13 is an illustration of waveforms appearing at parts of the system in FIG. 11.

In addition, in a circular frame A, there is shown an equivalent circuit for describing an operation of a circuit comprising the transistors 221b to 221g for giving a directionality of the aforesaid current. FIG. 13 shows signal waveforms at 4C, 5A and 5B in the illustration.

As shown in the circular frame A, the transistor 221b is switched by the transistors 221d and 221f to take one of two conditions: a two-way conducting state and a predetermined-direction conducting state indicated by a diode, while the transistor 221c is similarly switched by 221f and 221g to take one of these two states, with the transistor 221b and the transistor 221c being switched according to a PSK-modulated transmission carrier (4C) in a manner of being set such that one takes the two-way conducting state when the other assumes the predetermined-direction conducting state. Thus, a signal 5B (=4E) to be transmitted from the resonance circuit 6 assumes a waveform in which the amplitude of the transmission carrier shifts vertically according to the modulated transmission data.

Incidentally, the transmission data 4B indicated in FIG. 10 can also be encoded as well as in the embodiment 1. In this case, the decoding on the R/W 200 side becomes necessary.

As described above, since the data transmission from the card 100 side to the R/W 200 side is done through a frequency (in the above-described example, ¼ of the frequency of the power transmission) different from that for the power transmission from the R/W 200 side to the card 100 side and the data reception resonance circuit 23 having a resonance frequency matching with the data transmission frequency is placed on the R/W 200 side, a power wave component occurring in the resonance circuit by the electromagnetic coupling with the power and data transmission resonance circuit 5 of the R/W 200 is easily removably through the filter 24, thus enabling the enlargement of the communication range. Additionally, since the card 100 side employs one resonance circuit, the rise in cost is suppressible.

Embodiment 3

Figure 14:
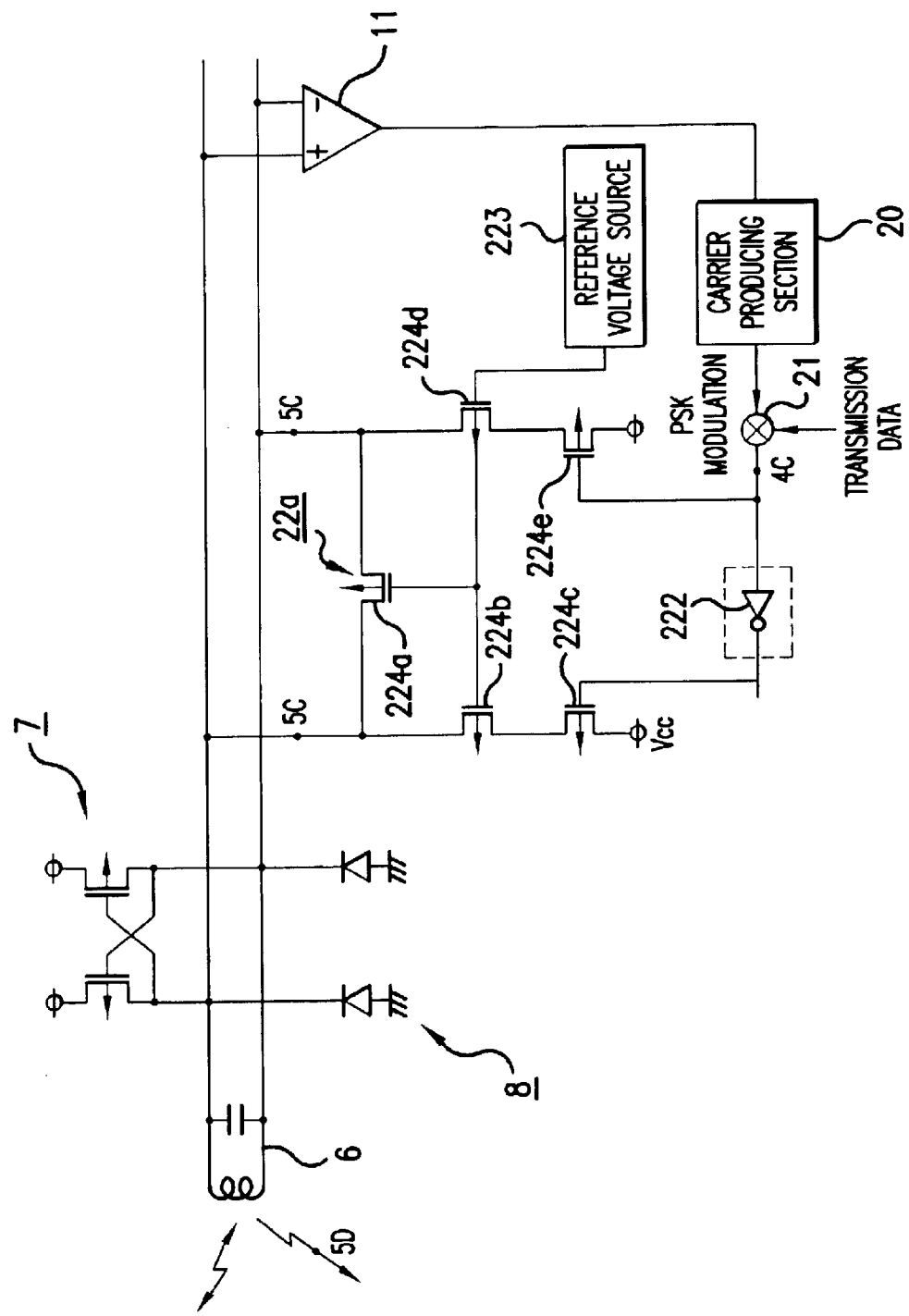
FIG. 14 is an illustration of one example of a regulator according to an embodiment 3 of this invention.

FIG. 14 shows a configuration of a card, particularly a regulator, of a non-contact IC card system according to still another embodiment of this invention. The regulator according to this embodiment has a simpler structure as compared with the regulator in the embodiment 2, and a simple structural alteration allows the arrangement of both the regulators in the embodiments 1 and 2.

In a regulator 22a in FIG. 14, a P-channel transistor 224a is a transistor for the adjustment of a voltage across the resonance circuit 6, P-channel transistors 224b and 224c are transistors for making a current flow in one direction of the regulator 22a, P-channel transistors 224d and 224e are transistors for making a current flow in the other direction of the regulator 22a. In this regulator 22a, the current is made to directly flow from a power supply voltage Vcc, indicated on a lower side of the illustration, toward the resonance circuit 6 through any one of the aforesaid transistor sets according as "H" level or "L" level of the modulated transmission carrier (4C). Thus, because of no absence of the switching feature, as compared with the regulator 22 in FIG. 11, the configuration for giving the directionality to the adjustment transistor 224a becomes simpler accordingly. Besides, the waveforms at 4C, 5C and 5D are the same as those at 4C, 5A and 5B in FIG. 11.

Furthermore, in this regulator 22a, as indicated by a broken line in FIG. 14, if the inverter 222 is removed and the same transmission carrier (4C) is given to the transistors 224c and 224e, as well as 1P, 2B and 3C in the embodiment 1, the resonance circuit 6 can generate an AM-modulated signal whose amplitude varies.

Figure 15:
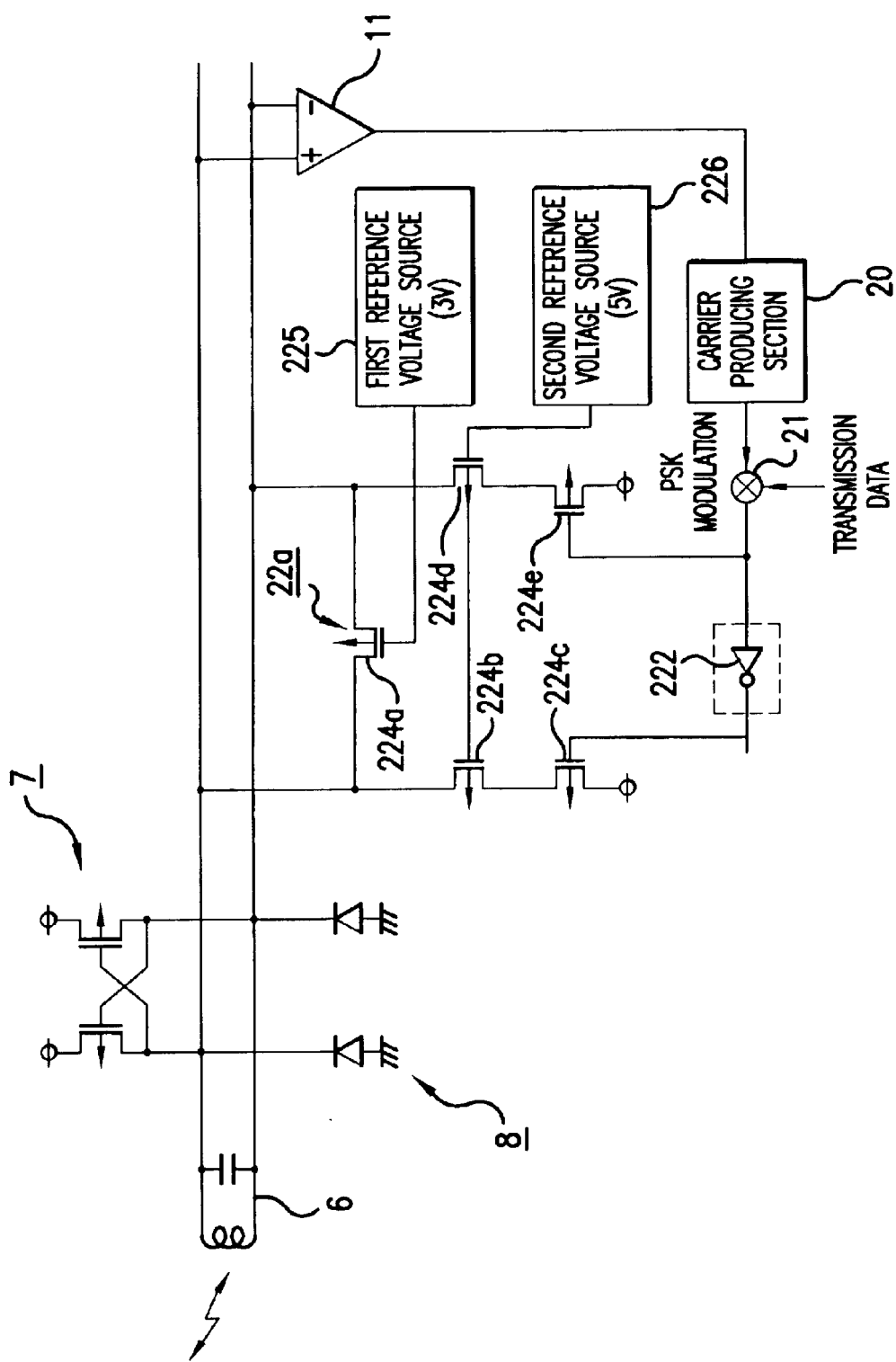
FIG. 15 is an illustration of another example of the regulator according to the embodiment 3 of this invention.

Still furthermore, as FIG. 15 shows, it is also possible that, as well as in FIG. 2 showing the embodiment 1, two different voltage sources forming a first reference voltage source 225 (3V) and a second reference voltage source 226 (5V) are provided so that a voltage to be applied to the gate of the transistor 224a is different from a voltage to be supplied to the bases of the transistors 224b and 224d.

Embodiment 4

A difference from the embodiment 2 is that, for the transmission from the card, another data transmission resonance circuit having a resonance frequency fitted to a frequency for the data transmission is used on the card side.

Figure 16:
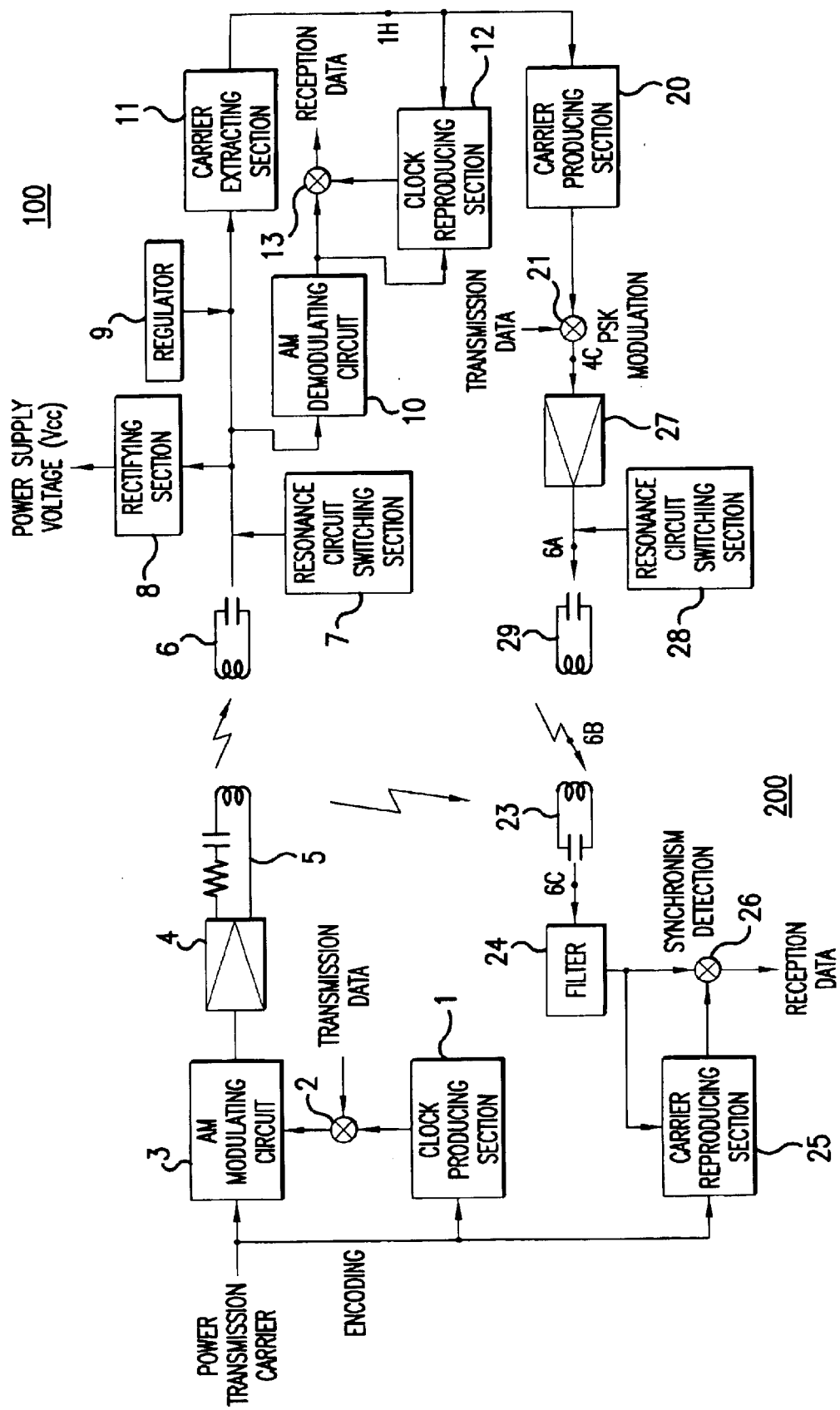
FIG. 16 is an illustration of a configuration of a system according to an embodiment 4 of this invention.
Figure 18:
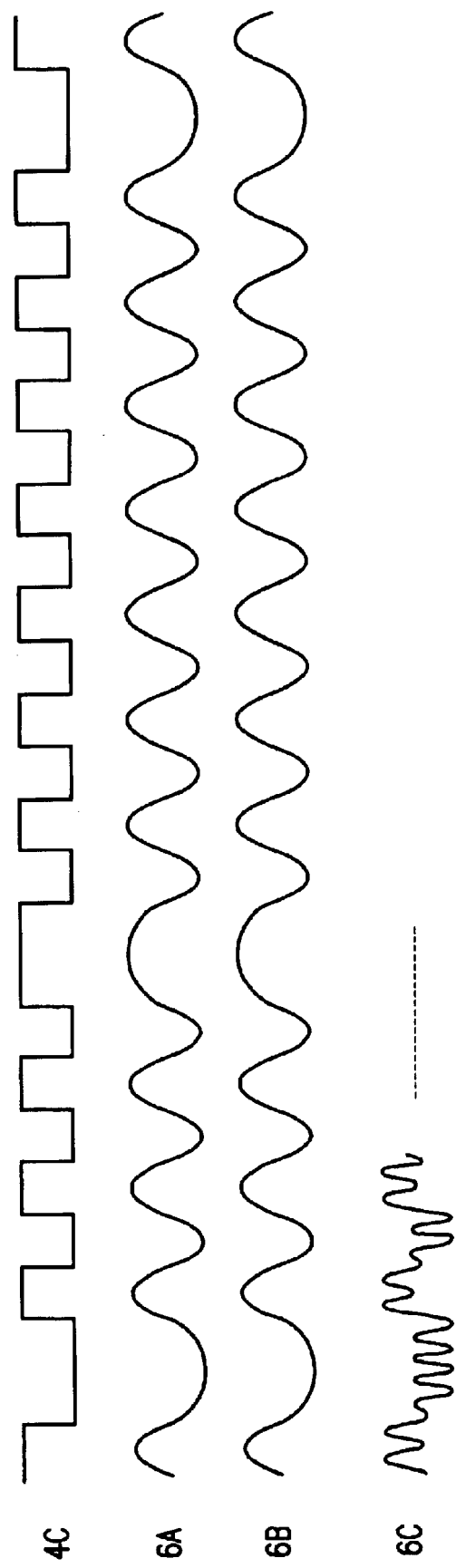
FIG. 18 is an illustration of waveforms appearing at parts of the system in FIG. 16.

FIG. 16 shows a configuration of a non-contact IC card system according to a further embodiment of this invention, where a difference from the above-described embodiment is that a resonance circuit, dedicated to the data transmission, comprising a data transmission resonance circuit 29, a resonance circuit switching section 28 and a driver 27 is provided on the card 100 side. FIG. 18 shows signal waveforms at 4C and 6A to 6C in the illustration.

In the data transmission from the card 100, the driver 27 and the resonance circuit switching section 28 drive the data transmission resonance circuit 29 in accordance with a signal (4C) PSK-modulated in the PSK modulator 21.

Figure 17:
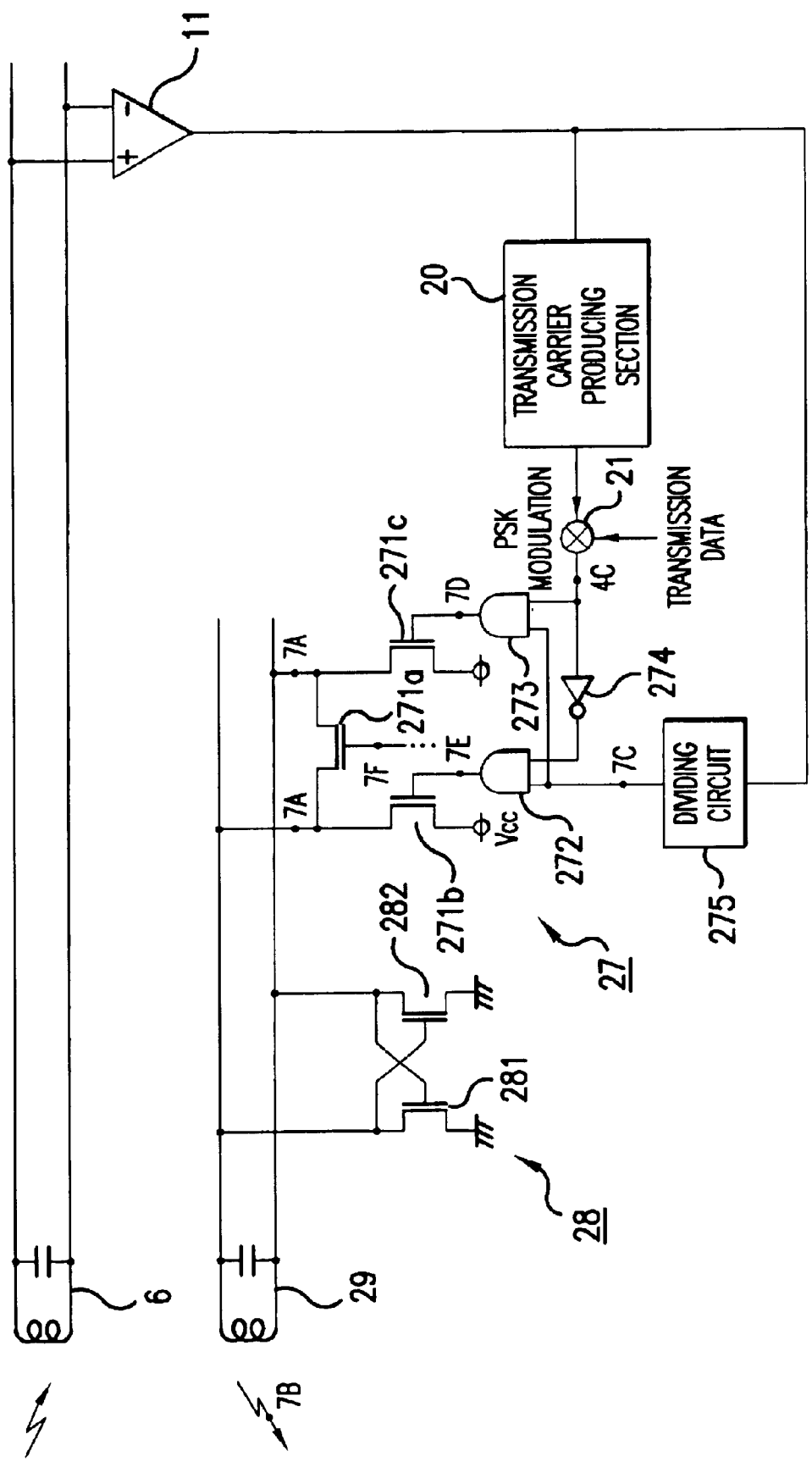
FIG. 17 is an illustration of one example of the driver in FIG. 16.
Figure 19:
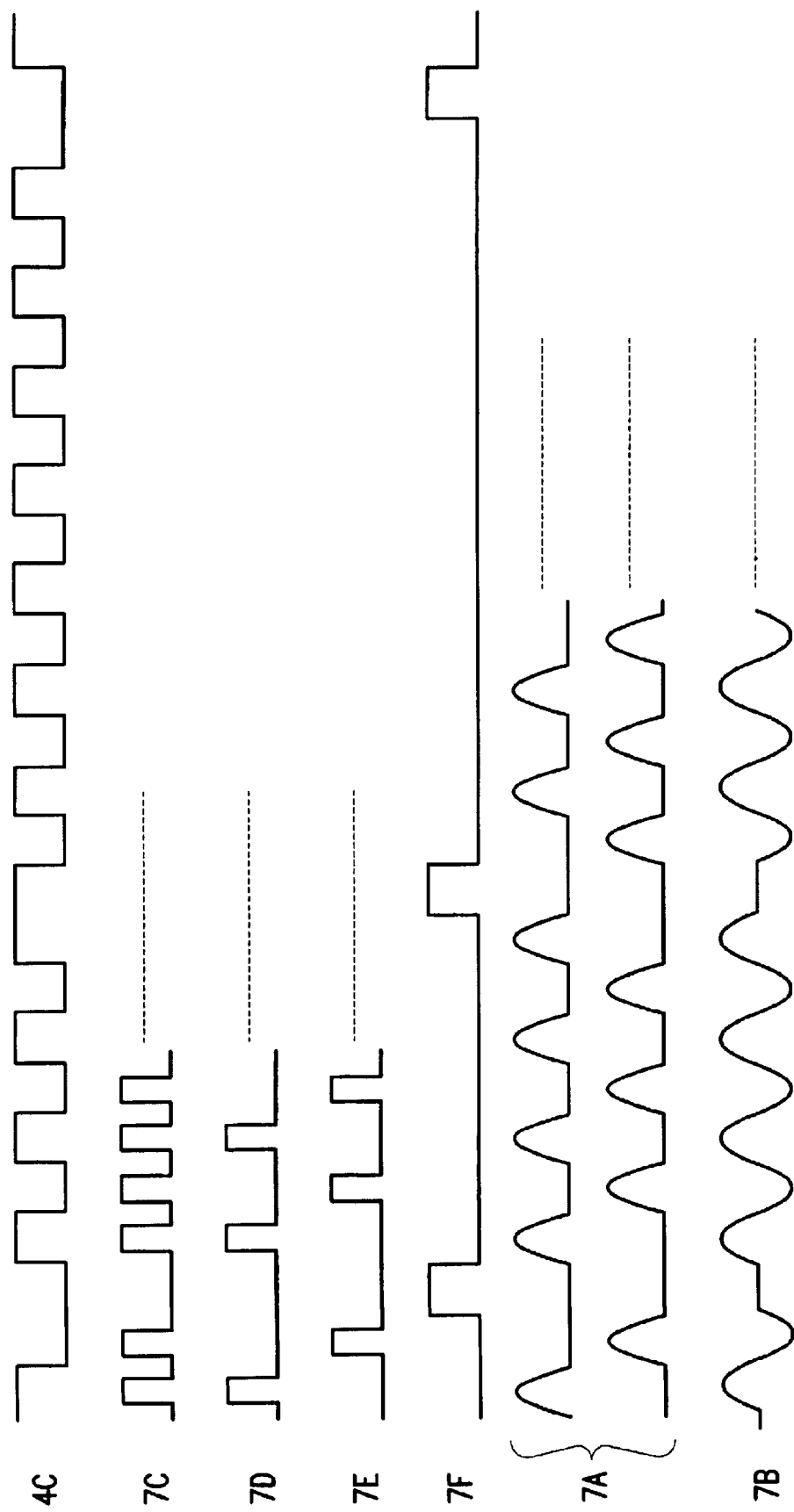
FIG. 19 is an illustration of waveforms appearing at parts of the driver in FIG. 17.

FIG. 17 shows one example of the driver 27 in FIG. 16. The driver 27 is made up of N-channel transistors 271a to 271c, AND gates 272, 273, an inverter 274 and a diving circuit 275. Furthermore, the resonance circuit switching section 28 includes N-channel transistors 281 and 282. FIG. 19 shows signal waveforms at 4C and 7A to 7F in the illustration.

The transistor 271a is a transistor, well known so far, which is made to be set to an ON state (conducting state) at a varying point of transmission data and kept in this state for half period to shift the phase of a transmission carrier by 180 degrees for phase modulation, and which performs a high-speed modulation of a signal compulsorily. Furthermore, also seen from the waveform 7A, the transistors 271b and 271c are transistors for driving the resonance circuit 29 by alternately allowing the flowing of a current from the power supply voltage Vcc according to the outputs (7E, 7D) of the AND gates 272 and 273. Additionally, the AND gates 272 and 273 receive a transmission carrier PSK-modulated by the transmission data or the inverted signal of this transmission carrier and the output of the dividing circuit 275. The output of the dividing circuit 275 has a smaller pulse width as compared with the data transmission carrier indicated by the waveform 4C, thereby decreasing the duty ratio of the driver 27 and enhancing the power efficiency.

Accordingly, owing to the data transmission resonance circuit 29 provided on the card 100 side, not only the transmission signal is increasable, but also the reception on the R/W 200 side becomes easy, and even the enlargement of the communication range becomes feasible.

Besides, since the duty of a signal for driving the driver is made smaller, the power consumption at the transmission is reducible.

Embodiment 5

This embodiment is for improving the power efficiency at the data transmission on the card side in the embodiment 4. The drive depends upon a current flowing in a power and data reception resonance circuit making the electromagnetic coupling to a data transmission resonance circuit.

Figure 20:
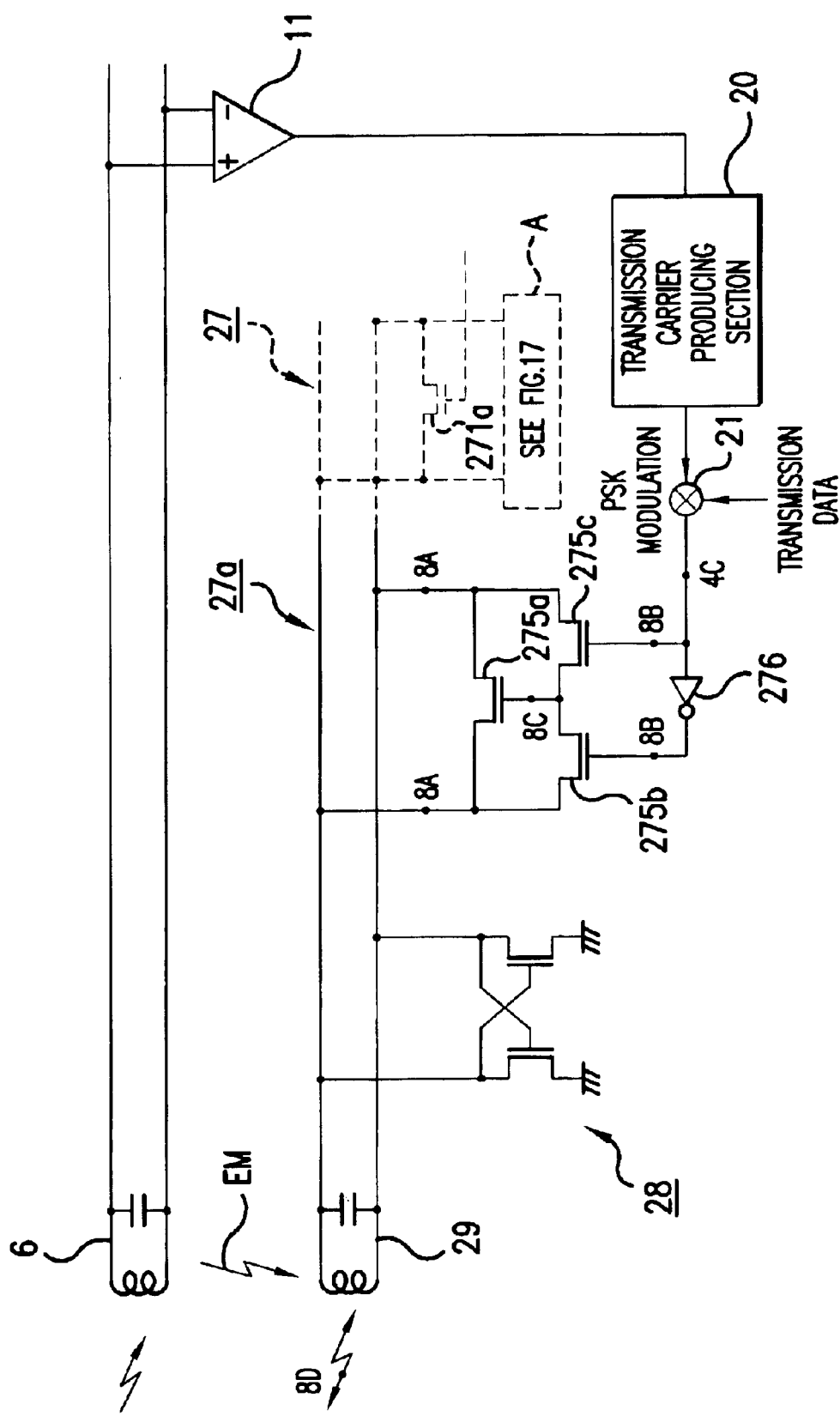
FIG. 20 is an illustration of one example of a card in a system according to an embodiment 5 of this invention.
Figure 21:
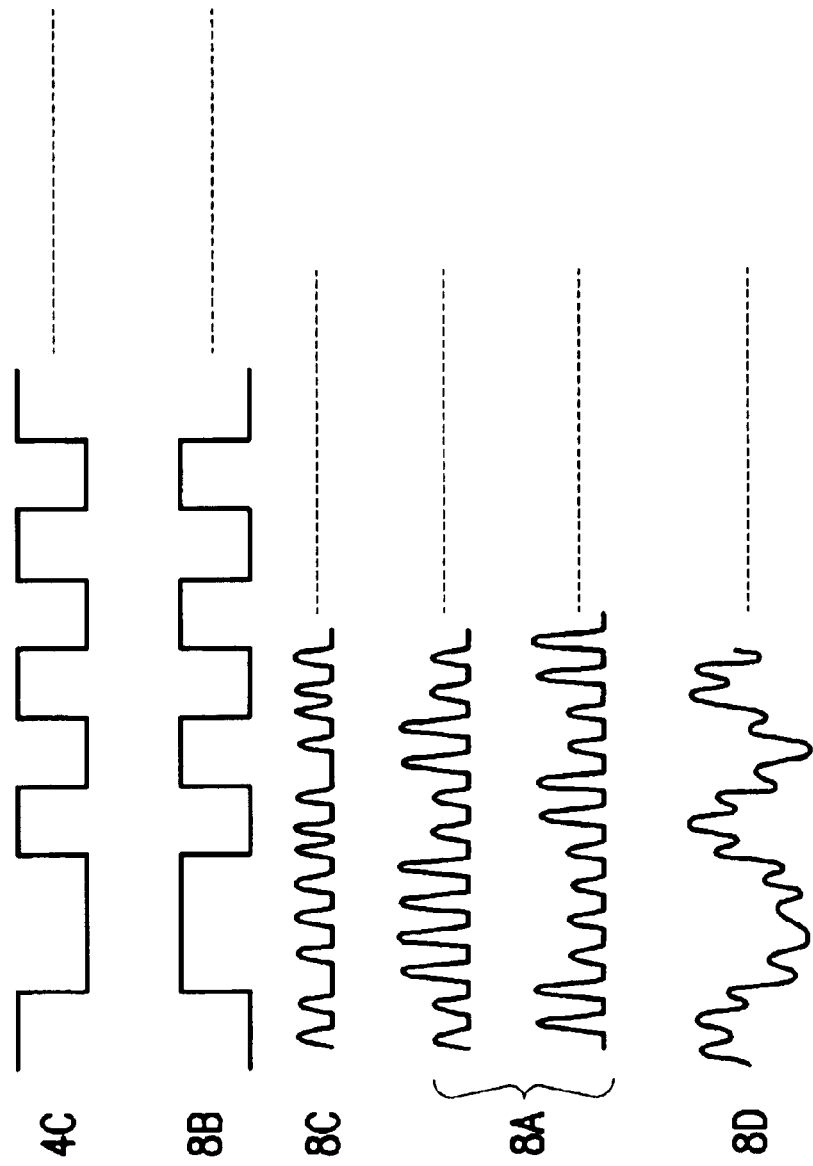
FIG. 21 is an illustration of waveforms showing at parts of the card in FIG. 20.

FIG. 20 shows a configuration of a card, particularly, a driver, of a non-contact IC card system according to a further embodiment of this invention. The driver 27a is made up of N-channel transistors 275a and 275c and an inverter 276. FIG. 21 shows signal waveforms at 4C and 8A to 8D in the illustration.

In this embodiment, by utilizing the electromagnetic coupling between the power resonance circuit 6 and the data transmission resonance circuit 29, as indicated at EM in FIG. 20, a transmission carrier is generated from a data transmission resonance circuit 29 by the electromagnetic induction due to the oscillation of the resonance circuit 6. The voltage generated in the resonance circuit 29 is clamped according to the polarity of the transmission carrier by a driver 27a, thus generating the transmission carrier.

As indicated by a broken line in FIG. 20, it is also possible to further add a configuration in which an N-channel transistor 271a is provided so that the resonance circuit 29 is turned on at the time of modulation to perform a high-speed modulation for the half period.

In addition, as indicated at A, the circuit comprising the N-channel transistors 271b, 271c, the AND gates 272, 273, the inverter 274 and the dividing circuit 275 is connected to the N-channel transistor 271a to establish a combination with the embodiment 4.

In this way, by utilizing the coupling to the power resonance circuit, for the power for the data transmission, the data transmission power is obtainable efficiently.

Figure 22:
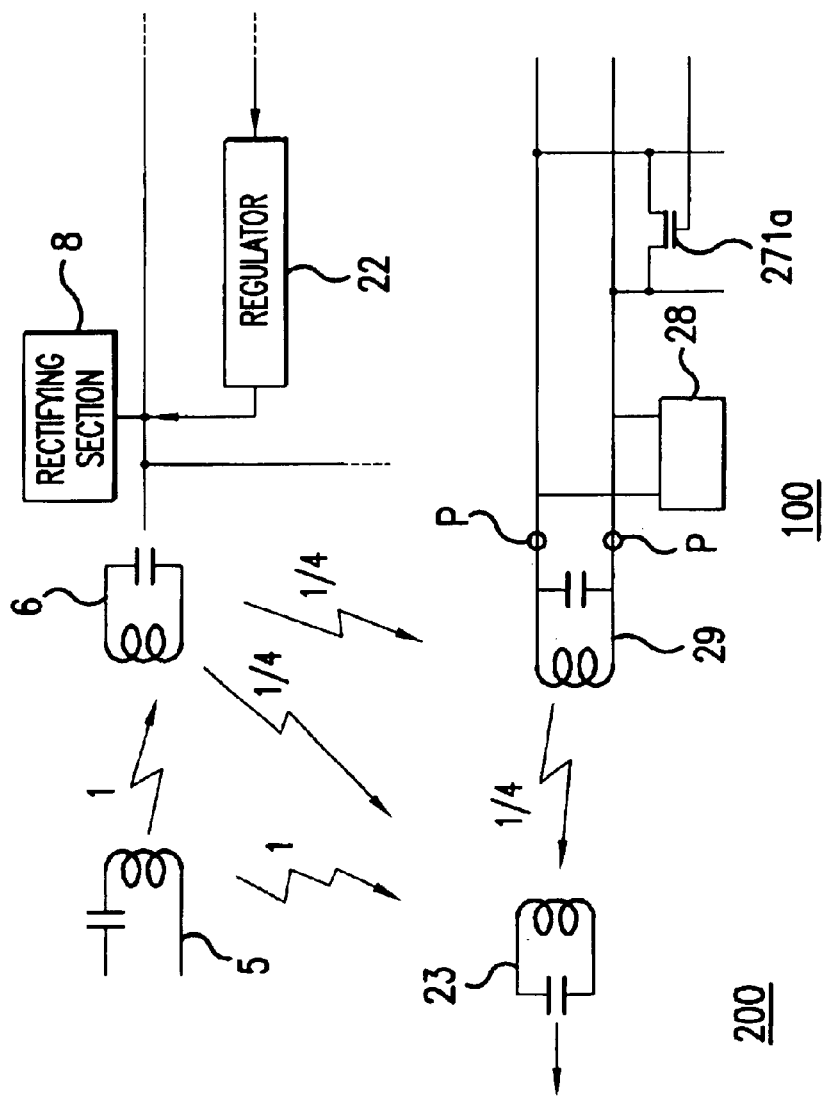
FIG. 22 is an illustration of another example of the system according to the embodiment 5 of this invention.

Still additionally, in the system according to the embodiment 2 shown in FIG. 10, as shown in FIG. 22, if the resonance circuit 29 having a resonance frequency matching with the frequency of the data transmission carrier is provided on the card 100 side, the energy of the resonance circuit 6 generates an oscillation with a data transmission frequency being ¼ of the frequency of the power transmission carrier in the resonance circuit 29, and the data reception resonance circuit 23 on the R/W 200 side receives this oscillation, with the result that the data transmission strength is improvable and a long-distance communication becomes feasible.

Incidentally, in FIG. 22, it is also appropriate that an open condition is taken between P—P, and that the transistor 271a in FIG. 17 is provided for performing the high-speed phase modulation.

Embodiment 6

In this embodiment, for both the data transmission and reception, a frequency different from a frequency for the power transmission is put to use.

Figure 23:
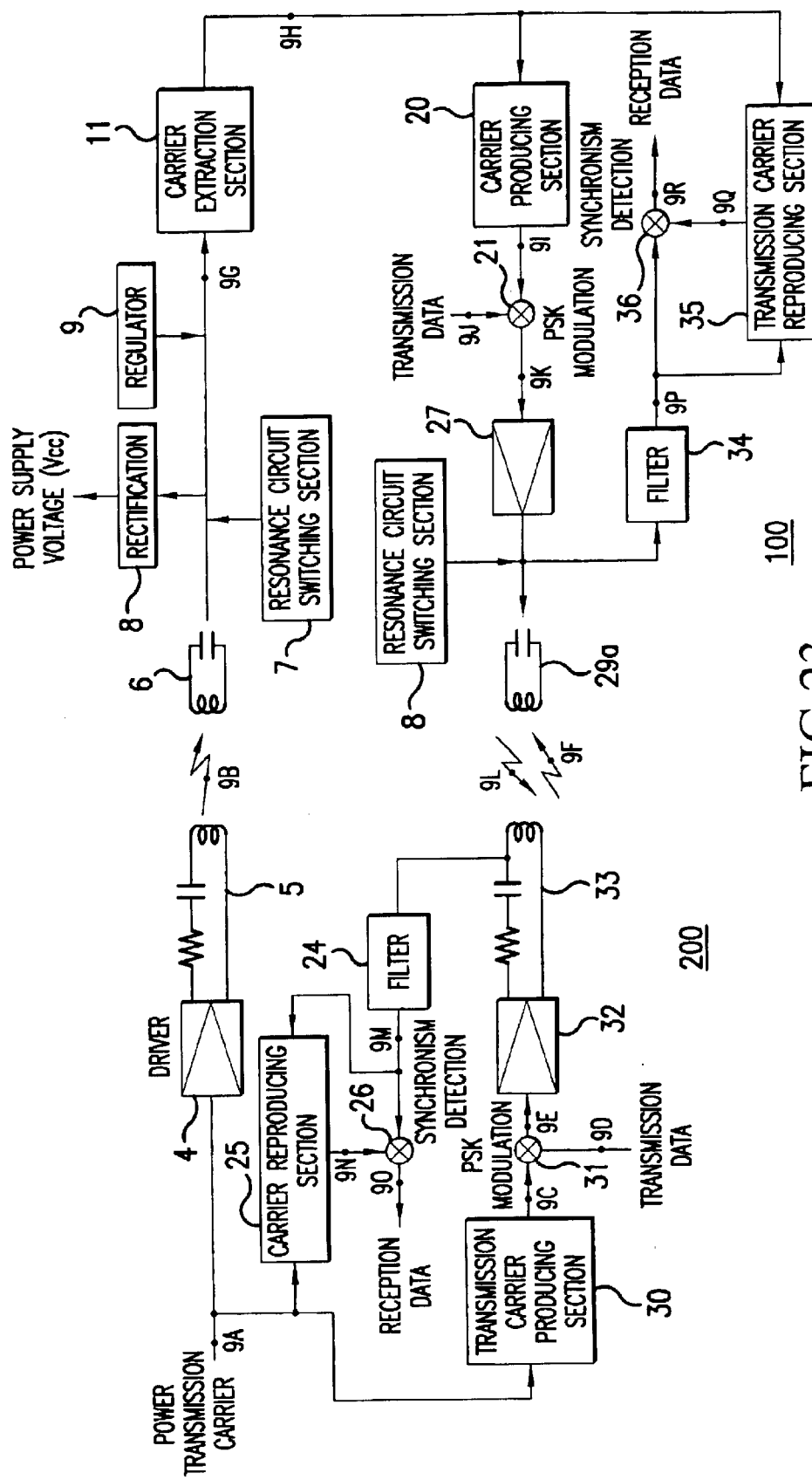
FIG. 23 is an illustration of a configuration of a system according to an embodiment 6 of this invention.
Figure 24:
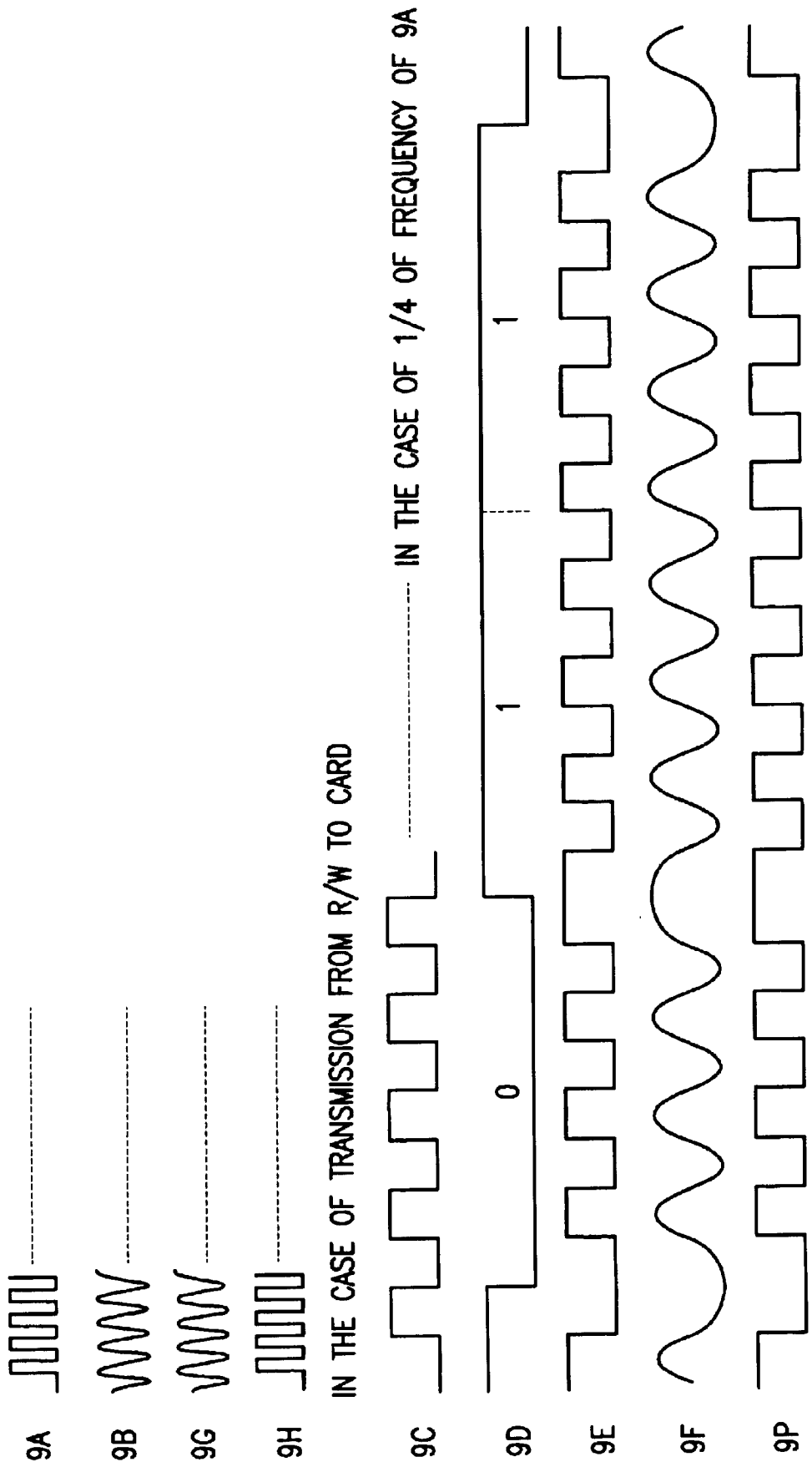
FIG. 24 is an illustration of waveforms showing at parts of the system in FIG. 23.
Figure 25:
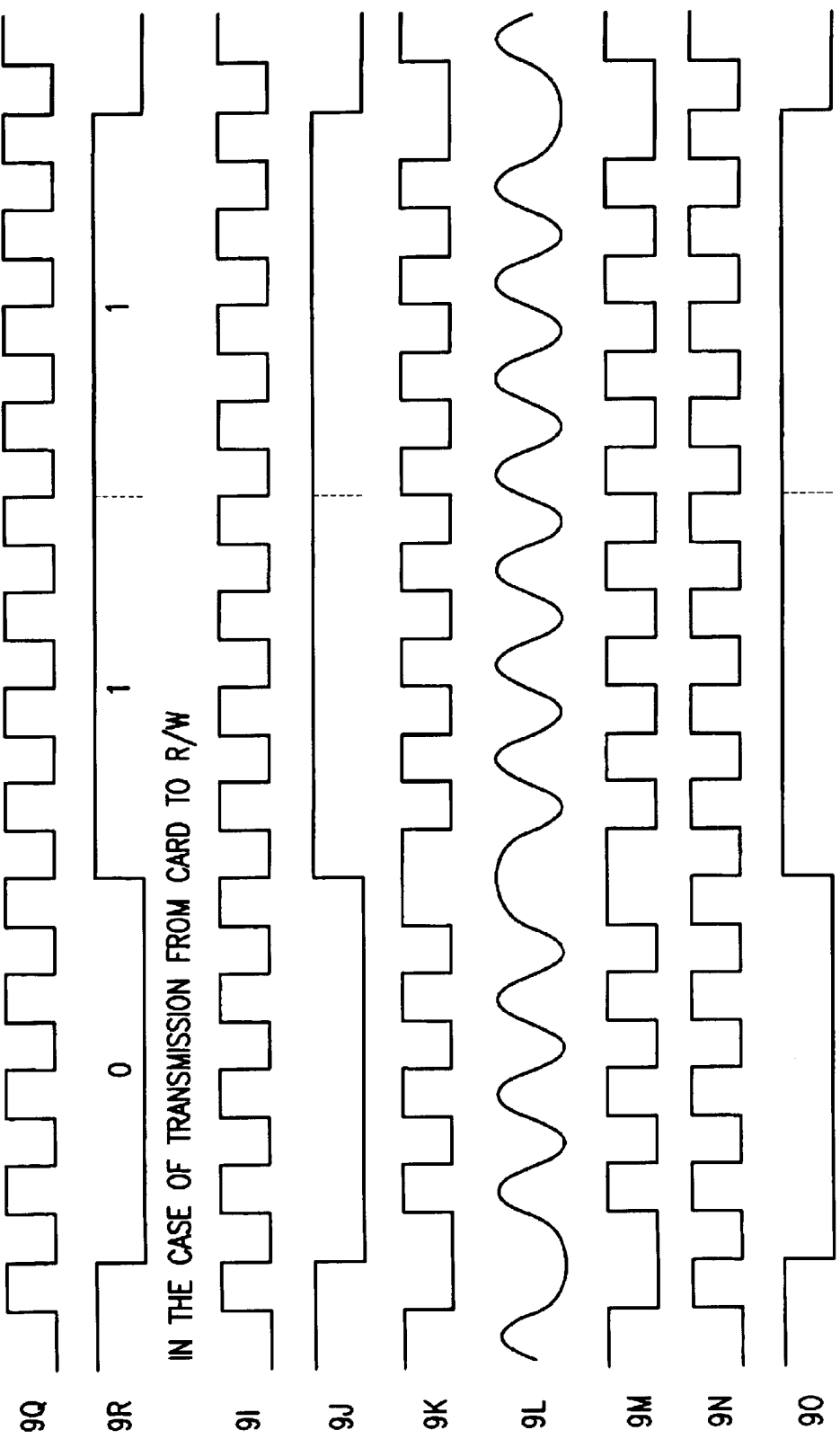
FIG. 25 is an illustration of waveforms showing at parts of the system in FIG. 23.

FIG. 23 shows a configuration of a non-contact IC card system according to a still further embodiment of this invention. In an R/W 200, numeral 30 represents a transmission carrier producing section, numeral 31 designates a PSK modulator, numeral 32 denotes a driver, and numeral 33 depicts a data transmission/reception resonance circuit. Furthermore, in a card 100, numeral 29a signifies a data transmission/reception resonance circuit, numeral 34 indicates a filter, numeral 35 shows a transmission carrier reproducing section, and numeral 36 means a synchronism detector. FIGS. 24 to 25 show signal waveforms at 9A to 9R in the illustration.

In the system shown in FIG. 23, on the R/W 200 side, the transmission carrier producing section 30 produces, from a power transmission carrier (9A), a transmission carrier (9C) having a frequency being, for example, ¼ of the frequency thereof, the PSK modulator 31 PSK-modulates (9E) this transmission carrier (9C) in accordance with transmission data 9D, and the driver 32 drives the data transmission/reception resonance circuit 33. On the card 100 side, the data transmission/reception resonance circuit 29a receives a data carrier 9F, and the filter 34 removes (9P) a power carrier introduced simultaneously. Furthermore, the carrier reproducing section 35 reproduces a data carrier (9Q), and, for example, the synchronism detector 36 conducts a synchronism detection to demodulate the signal 9P, thereby presenting reception data 9R. A detailed example of the driver 27 is the same as those in FIGS. 17 and 20.

Accordingly, since the power carrier component is removable through the use of the filter 34 on the card 100 side, the communication range is enlargeable.

Embodiment 7

This embodiment relates to, for example, the AM demodulating circuit and others in each of the above-described embodiments, and is for presenting an AM demodulating circuit capable of demodulating an AM-modulated wave at a high sensitivity.

Figure 26:
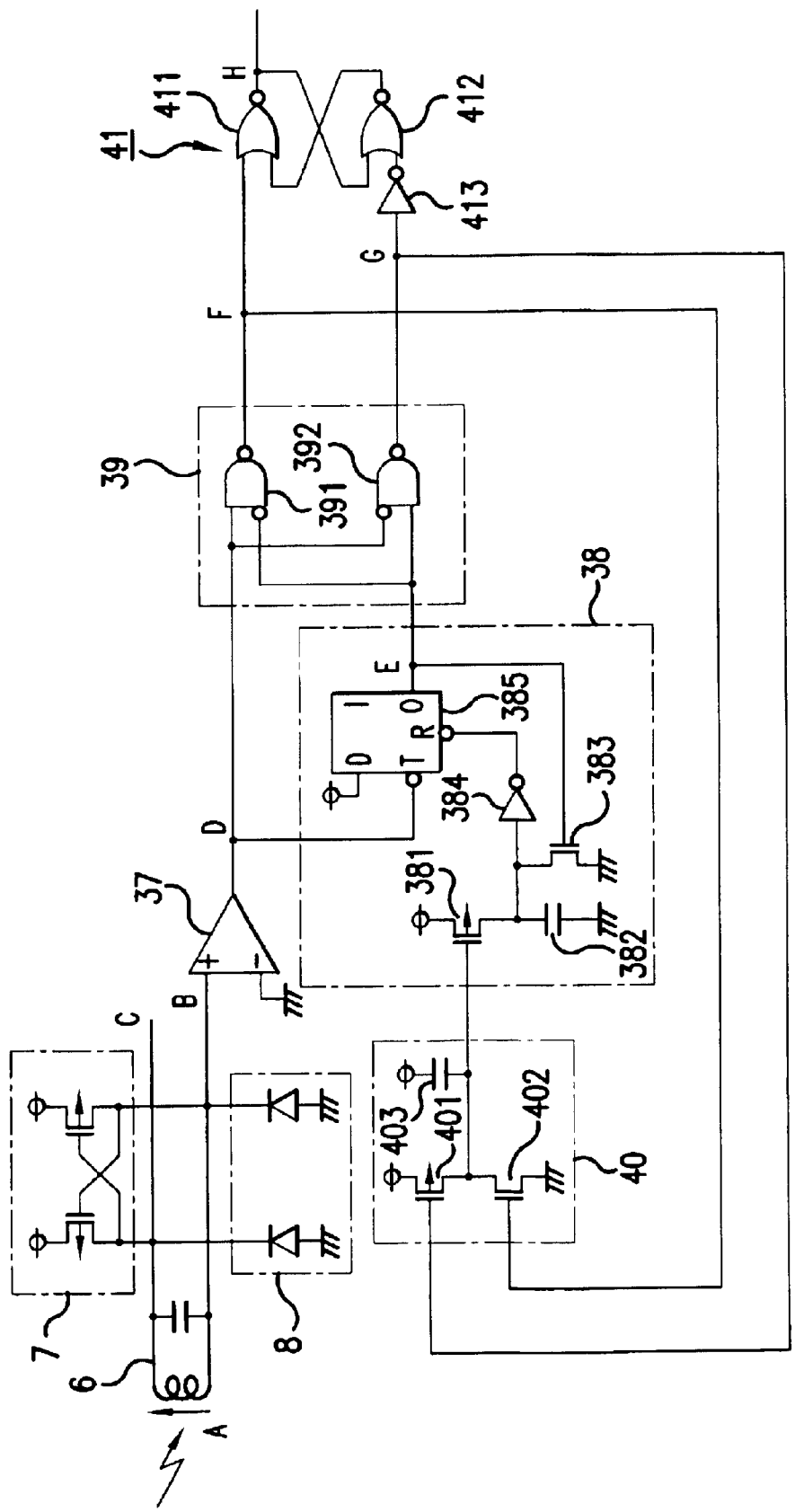
FIG. 26 is an illustration of one example of an AM demodulating circuit according to an embodiment 7 of this invention.

FIG. 26 shows a configuration of, particularly, an AM demodulating circuit in a non-contact IC card system according to a still further embodiment of this invention. The AM demodulating circuit 10 is made up of a comparator 37, a reference pulse generating circuit 38, a pulse width comparing circuit 39, a loop filter 40 and an output flip-flop circuit 41.

Figure 27:
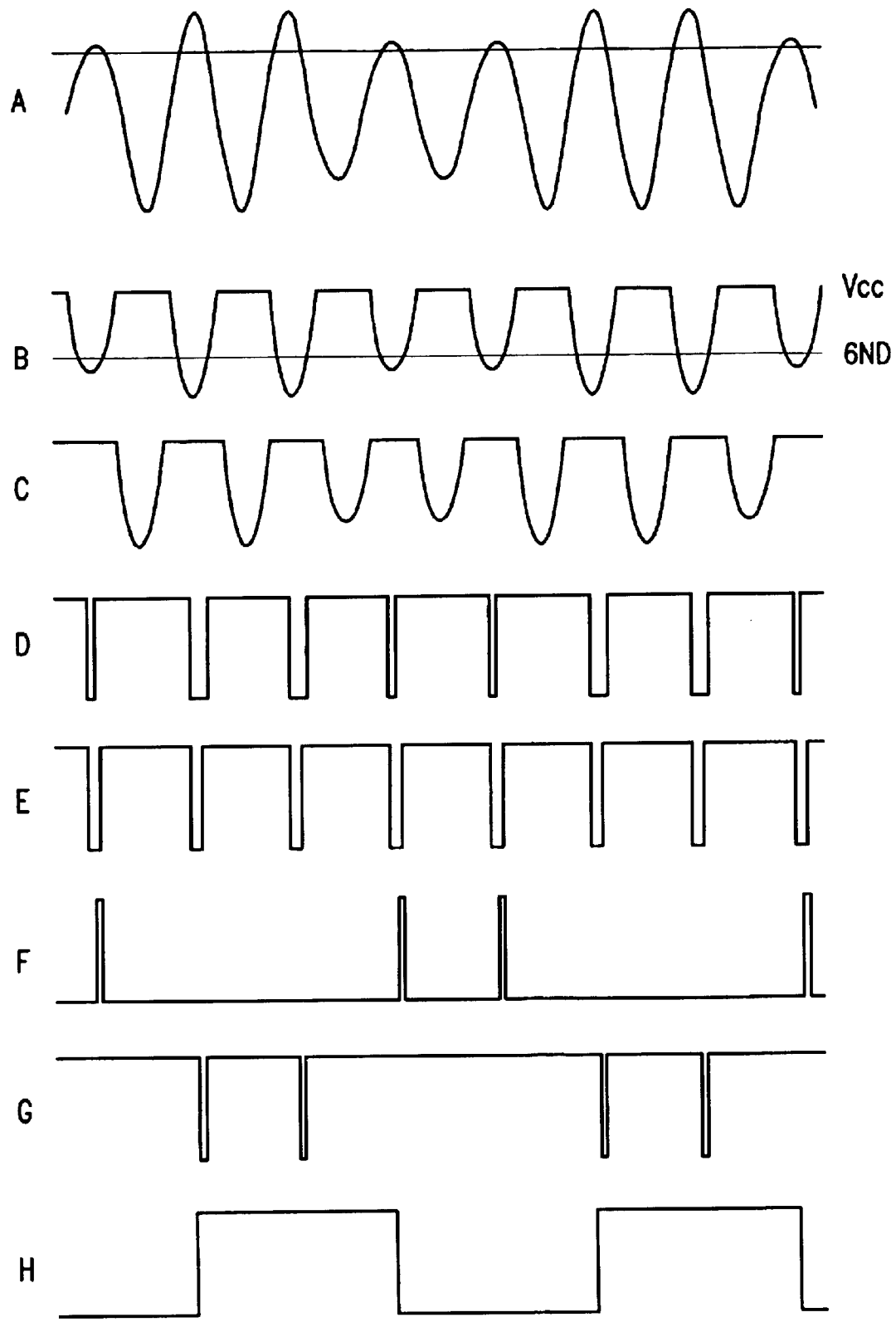
FIG. 27 is an illustration of waveforms showing at parts of the AM demodulating circuit in FIG. 26.

The reference pulse generating circuit 38 includes a P-channel transistor 381, a capacitor 382, an N-channel transistor 383, an inverter 384 and a D-type flip-flop 383. The pulse width comparing circuit 39 includes AND gates 291 and 392, one inputs of which receive an inverted signal. The loop filter 40 includes a P-channel transistor 401, an N-channel transistor 402 and a capacitor 403. Furthermore, the output flip-flop circuit 41 comprises NOR gates 411, 412 and an inverter 413. FIG. 27 shows signal waveforms at A to H in the illustration.

For instance, a signal AM-modulated and received by the resonance circuit 6 is compared with a reference level in the comparator 37 to be converted into a binary signal. In the case of the AM modulation, at the zero-cross, the modulation does not have influence on the binary value, whereas the influence of the modulation increases with the separation from the zero-cross position, and the pulse width of the output D of the comparator 37 varies in accordance with the data AM-modulated.

The reference pulse generating circuit 38 operates at the leading edge of the pulse D to generate a reference pulse E, and generates pulses F and G, reverse in polarity to each other, in accordance with the magnitudes of the widths of the reference pulse E and the input pulse D. In addition, this reference pulse generating circuit 38 uses a feedback loop including the loop filter 40 to adjust the width of the reference pulse E such that the width of the reference pulse E is increased as the input pulse D assumes a wider width and, on the contrary, the width of the reference pulse E is decreased as the input pulse D assumes a narrower width.

Furthermore, the output flip-flop circuit 41 generates a signal H inverting in accordance with the pulses F and G, that is, at the variation from the pulse F to the pulse G and at the variation from the pulse G to the pulse F. This signal H is the same as, for example, the output 1D of the encoder 2 for modulating the carrier on the R/W 200 side in FIG. 1, and this means the realization of the AM demodulation in the AM demodulating circuit 10.

Accordingly, since the AM modulation is taken as the variation of the pulse width and the demodulation is made on the basis of the magnitude of the pulse width, an AM demodulating circuit with a high demodulation sensitivity is attainable. Additionally, since most of the circuit can be constructed with a logic circuit and a capacitor having a large capacity is unnecessary, it is possible to construct the circuit in the form of an IC.

Besides, this AM demodulating circuit 100 is applicable not only to the AM demodulating circuit 10 on the card 100 side in FIG. 1, but also to a section comprising the AM detector 16 and the filter 17 on the R/W 200 side, and a higher sensitivity is obtainable as compared with a common envelope detection, and the circuit can easily be constructed as an IC.

Embodiment 8

This embodiment relates to, for example, a filter such as the filter 34 in the embodiment 6, and is for providing a filter capable of separating only a data transmission carrier from a signal, in which a power transmission carrier and the data transmission carrier are superimposed on each other, at a high sensitivity.

Figure 28:
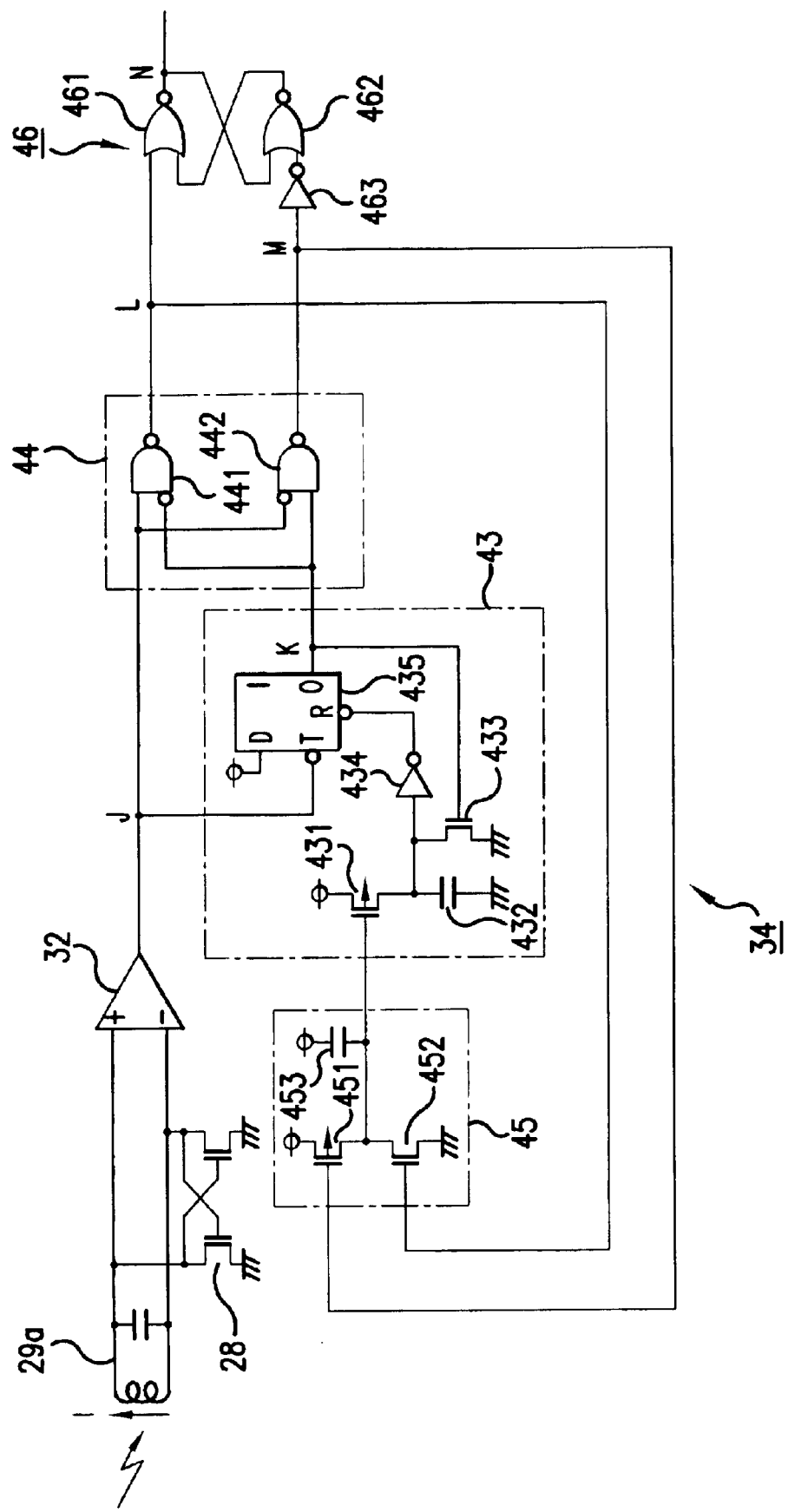
FIG. 28 is an illustration of one example of a filter according to an embodiment 8 of this invention.

FIG. 28 shows a configuration of, particularly, a filter in a non-contact IC card system according to a still further embodiment of this invention. The filter 34 is made up of a comparator 42, a reference pulse generating circuit 43, a pulse width comparing circuit 44, a loop filter 45 and an output flip-flop circuit 46.

Figure 29:
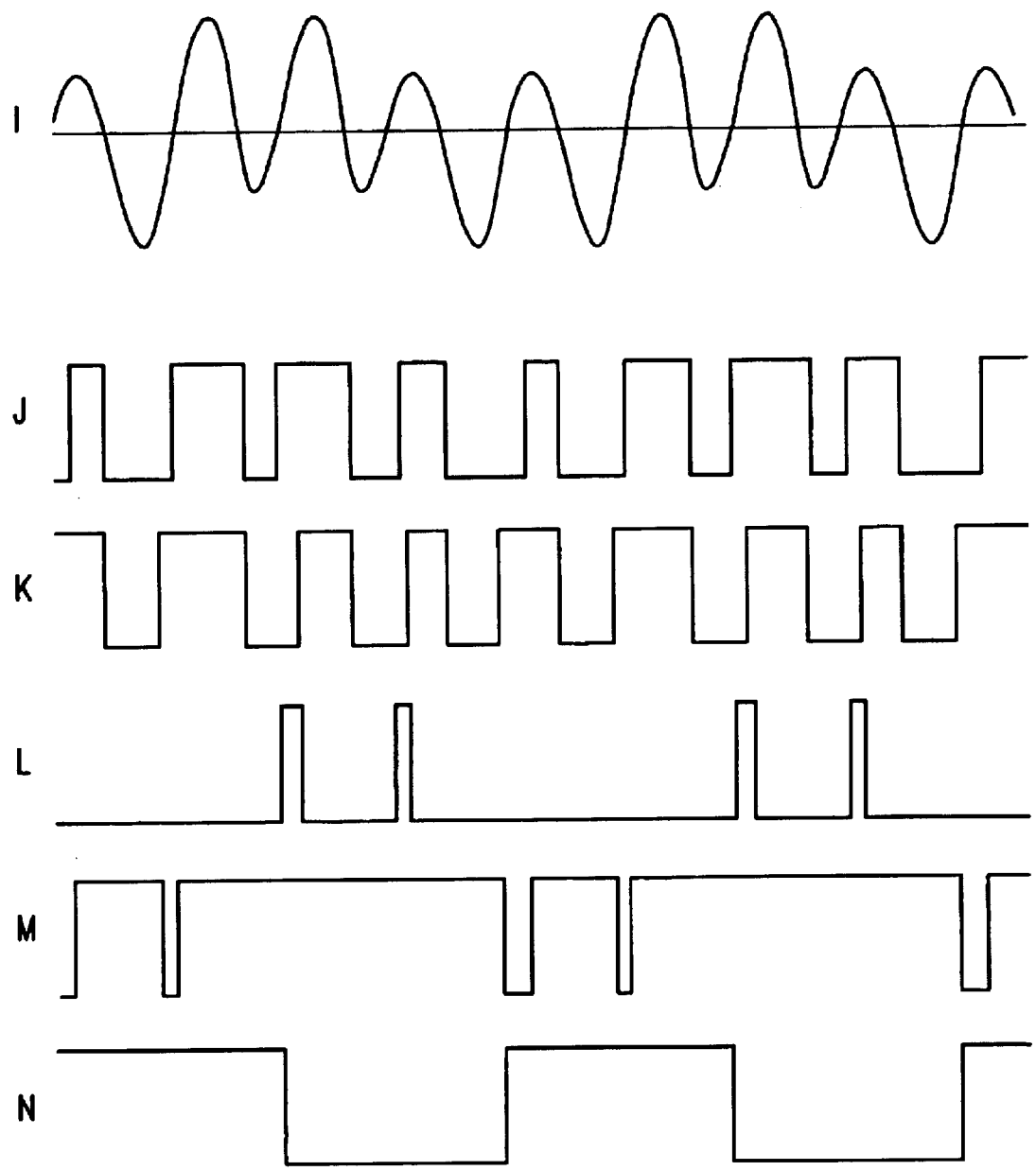
FIG. 29 is an illustration of waveforms showing at parts of the filter in FIG. 28.

The reference pulse generating circuit 43 includes a P-channel transistor 431, a capacitor 432, an N-channel transistor 433, an inverter 434 and a D-type flip-flow 435. The pulse width comparing circuit 44 includes AND gates 441 and 442, each inputs of which receive an inverted signal. The loop filter 45 includes a P-channel transistor 451, an N-channel transistor 452 and a capacitor 453. Furthermore, the output flip-flow circuit 46 includes NOR gates 461, 462 and an inverter 463. FIG. 29 shows signal waveforms at I to N in the illustration.

For instance, an voltage I developed in the data transmission/reception resonance circuit 29a is a signal in which the received power carrier and the data carrier are superimposed on each other, and this signal I is converted in the comparator 42 into a binary signal to produce a pulse J. The pulse width of this pulse J varies in accordance with the data carrier from the R/W.

The reference pulse generating circuit 43 generates a reference pulse K, and produces pulses L and M, reverse in polarity to each other, in accordance with the magnitudes of the widths of the reference pulse K and the input pulse J. In addition, this reference pulse generating circuit 43 uses a feedback loop including the loop filter 45 to adjust the width of the reference pulse K such that the width of the reference pulse K increases with the increase in the width of the input pulse J and, on the contrary, the width of the reference pulse K decreases with the decrease in the width of the input pulse J.

Furthermore, the output flip-flop circuit 46 generates a signal N inverting in accordance with the pulses L and M, that is, at the variation from the pulse L to the pulse M and at the variation from the pulse M to the pulse L. This signal N is the signal obtained by restoring the data carrier having a frequency, for example, being ¼ of the frequency of the power carrier from the R/W.

Accordingly, since the PSK-modulated carrier is taken as the variation of the pulse width and the restoration is made on the basis of the magnitude of the pulse width, it is possible to separate only the PSK-modulated data carrier accurately from a signal wave where the power carrier is superimposed. Additionally, it is possible to construct the circuit in the form of an IC.

Besides, this filter 34 is also applicable to the reception filter 24 on the R/W 200 side in the above-described embodiments 2 to 6, thus achieving the separation between the data carrier and the power carrier with high accuracy.

Embodiment 9

Although in all the above-described embodiments 1 to 5 the encoding is done, in this embodiment a sub-carrier is employed in the AM modulation and the load variation.

Figure 30:
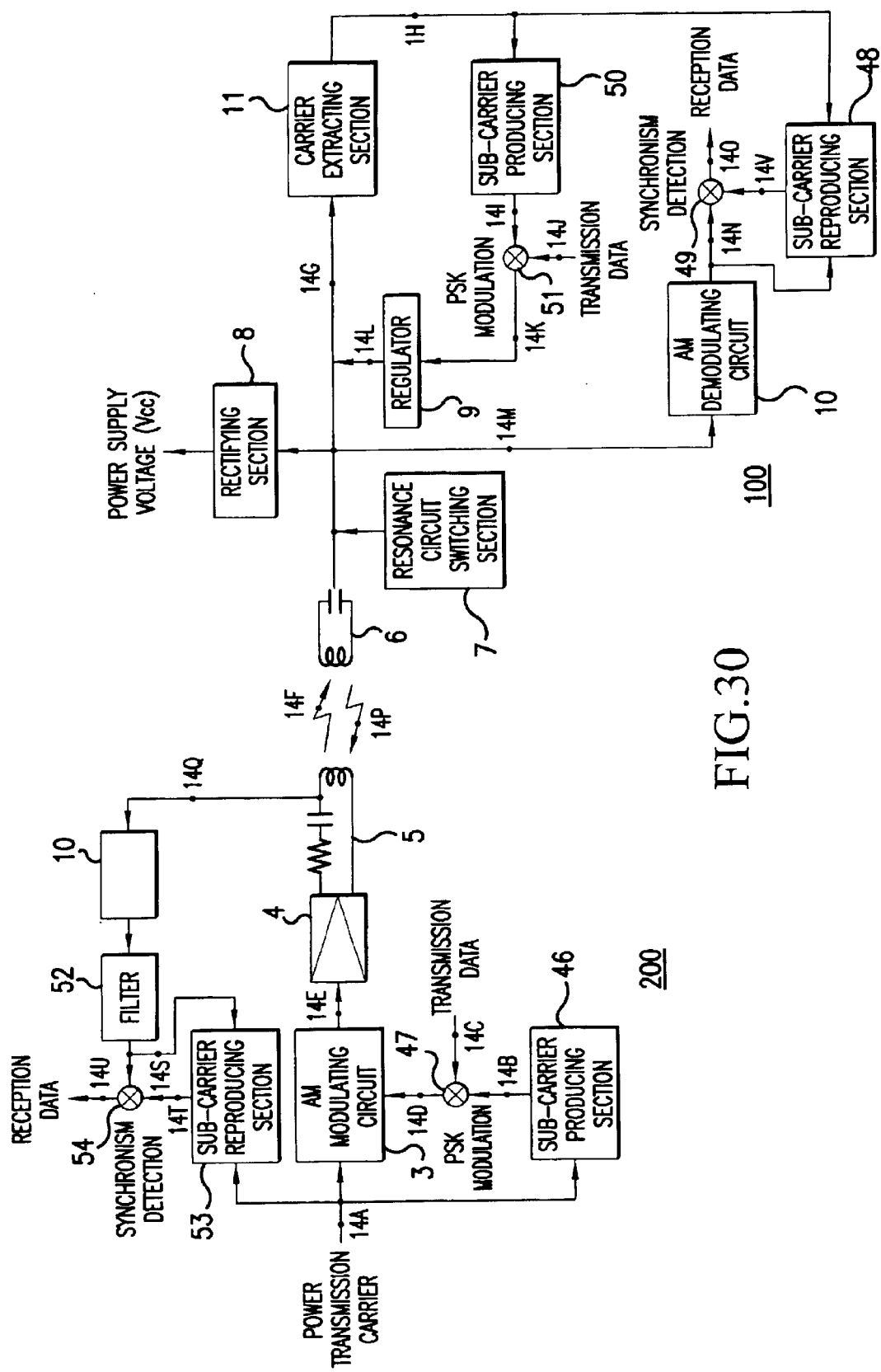
FIG. 30 is an illustration of a configuration of a system according to an embodiment 9 of this invention.
Figure 31:
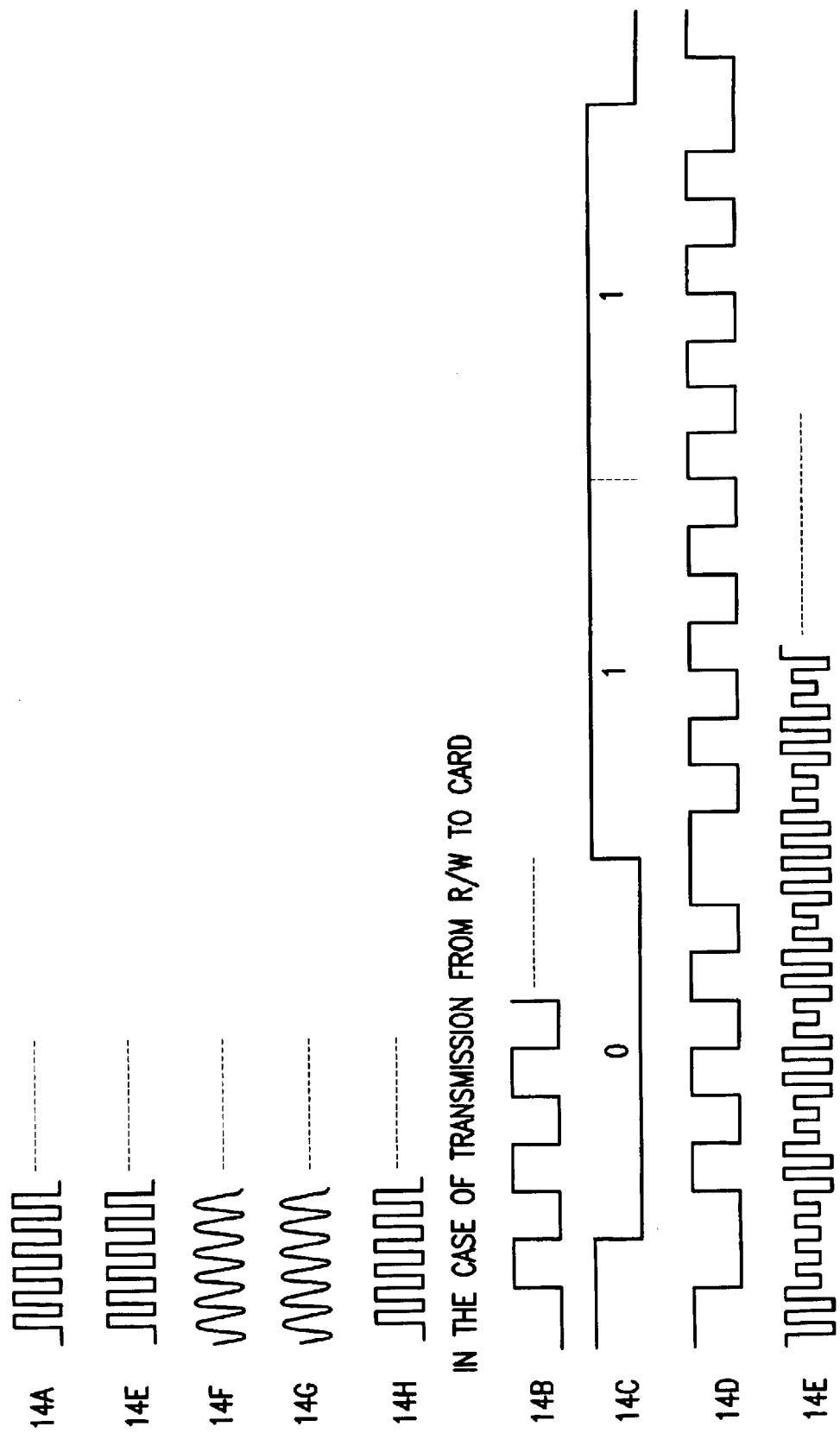
FIG. 31 is an illustration of waveforms showing at parts of the system in FIG. 30.
Figure 32:
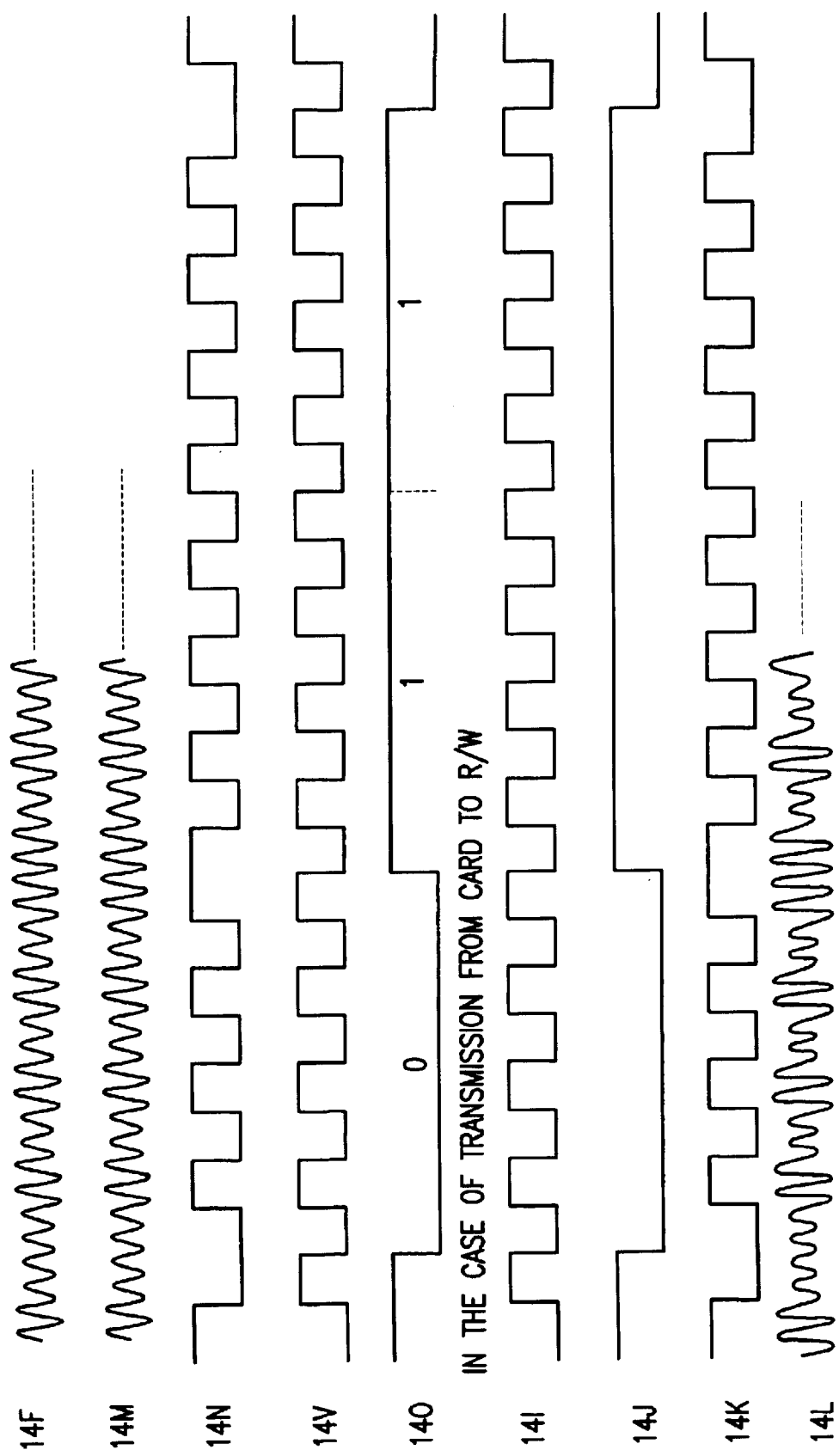
FIG. 32 is an illustration of waveforms showing at parts of the system in FIG. 30.
Figure 33:
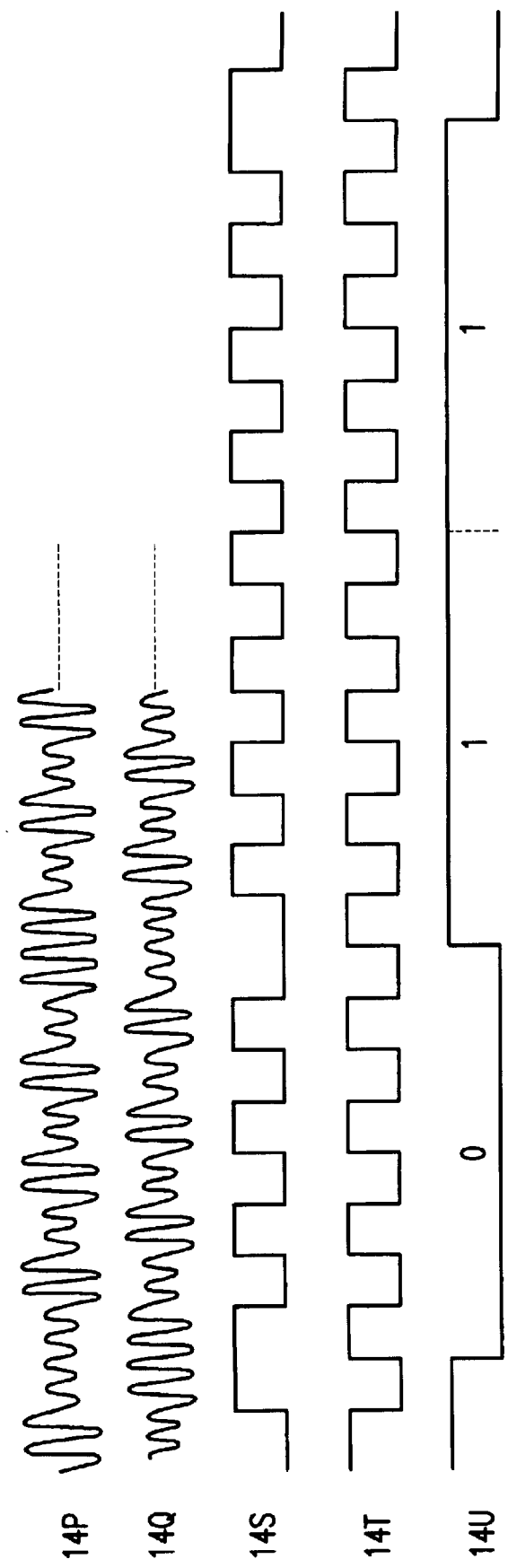
FIG. 33 is an illustration of waveforms showing at parts of the system in FIG. 30.

FIG. 30 shows a configuration of a non-contact IC card system according to a still further embodiment of this invention. In an R/W 200, numeral 46 depicts a sub-carrier producing section, numeral 47 denotes a PSK modulator, numeral 52 indicates a filter, numeral 53 signifies a sub-carrier reproducing section, and numeral 54 stands for a synchronism detector. Furthermore, in the card 100, numeral 48 represents a sub-carrier reproducing section, numeral 49 designates a synchronism detector, numeral 50 signifies a sub-carrier producing section, and numeral 51 depicts a PSK modulator. FIGS. 31 to 33 illustrate signal waveforms at 14A to 14V in the illustration.

In the transmission on the R/W 200 side, the sub-carrier producing section 46 produces a sub-carrier (14B) having a frequency being, for example, ¼ of that of a power transmission carrier 14A, and the PSK modulator 47 PSK-modulates (14D) this sub-carrier (14B) in accordance with transmission data (14C), and puts it in the AM modulating circuit 3.

On the card 100 side, the AM demodulator 10 demodulates a sub-carrier (14M) PSK-modulated according to the transmission data. Furthermore, the sub-carrier reproducing section 48 produces a non-modulated sub-carrier (14V), and the synchronism detector 49 demodulates data through the synchronism detection, thereby presenting reception data 140.

On the other hand, in the transmission on the card 100 side, and the sub-carrier producing section 50 produces a sub-carrier (14I), the PSK modulator 51 PSK-modulates (14K) the sub-carrier according to transmission data 14J, with the regulator 9 being driven by the PSK-modulated sub-carrier (14K) for modulation.

In the reception on the R/W 200 side, the AM detector 10 AM-detects an AM-modulated wave (14Q) appearing in the resonance circuit 5, and the filter 52 or a synchronism amplifier separates (14S) a sub-carrier (14S) PSK-modulated according to transmission data. Meanwhile, the sub-carrier reproducing section 53 reproduces a non-modulated sub-carrier (14T), and the synchronism detector 54 demodulates the PSK-modulated data through synchronism detection, thereby providing reception data 14U.

Owing to using the sub-carrier in this way, the signal can assume a narrower band as compared with the case of the encoding; whereupon, the extraction becomes easy and the S/N ratio is improvable, which can lengthen the communication range.

Figure 34:
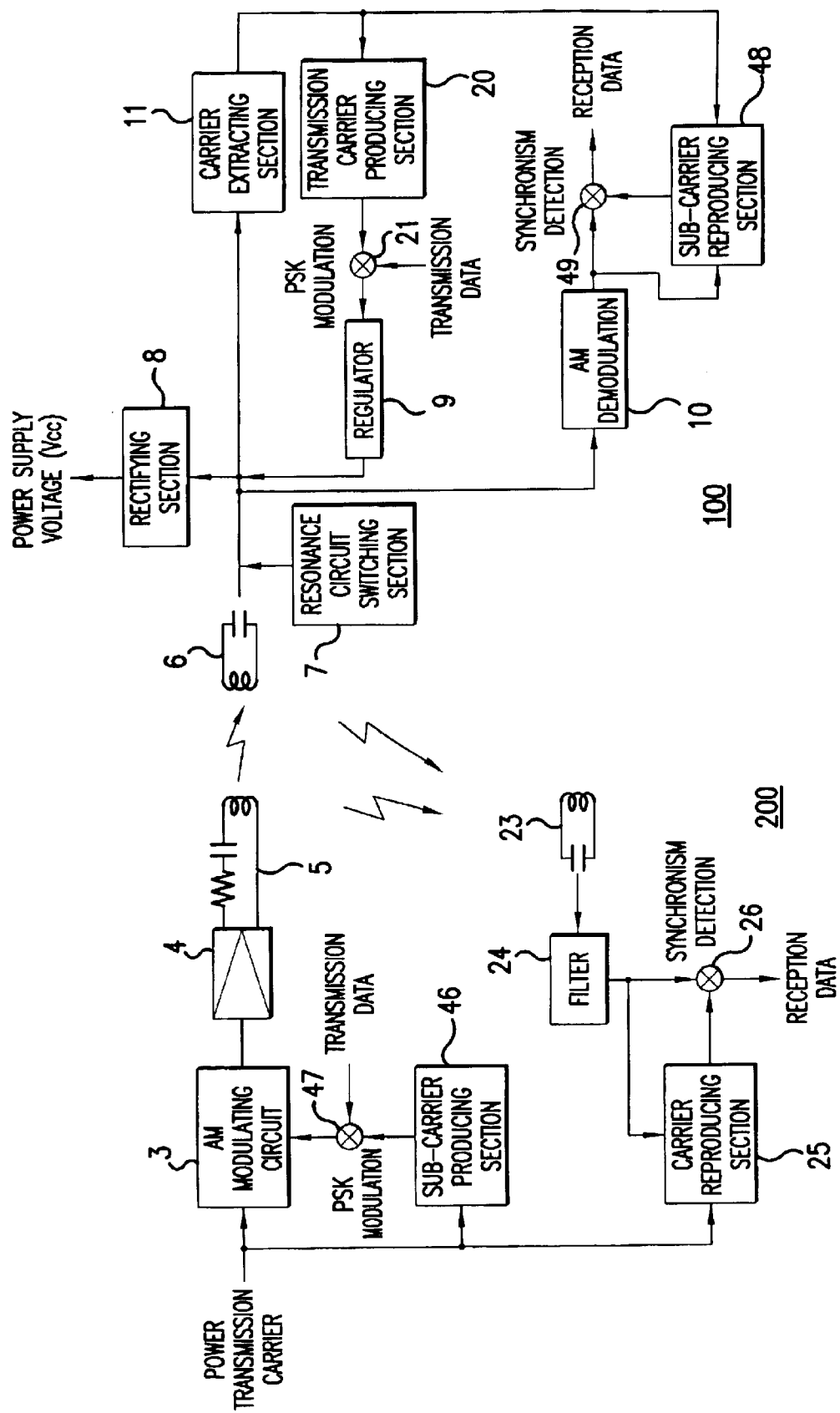
FIG. 34 is an illustration of another configuration of the system according to the embodiment 9 of this invention.
Figure 35:
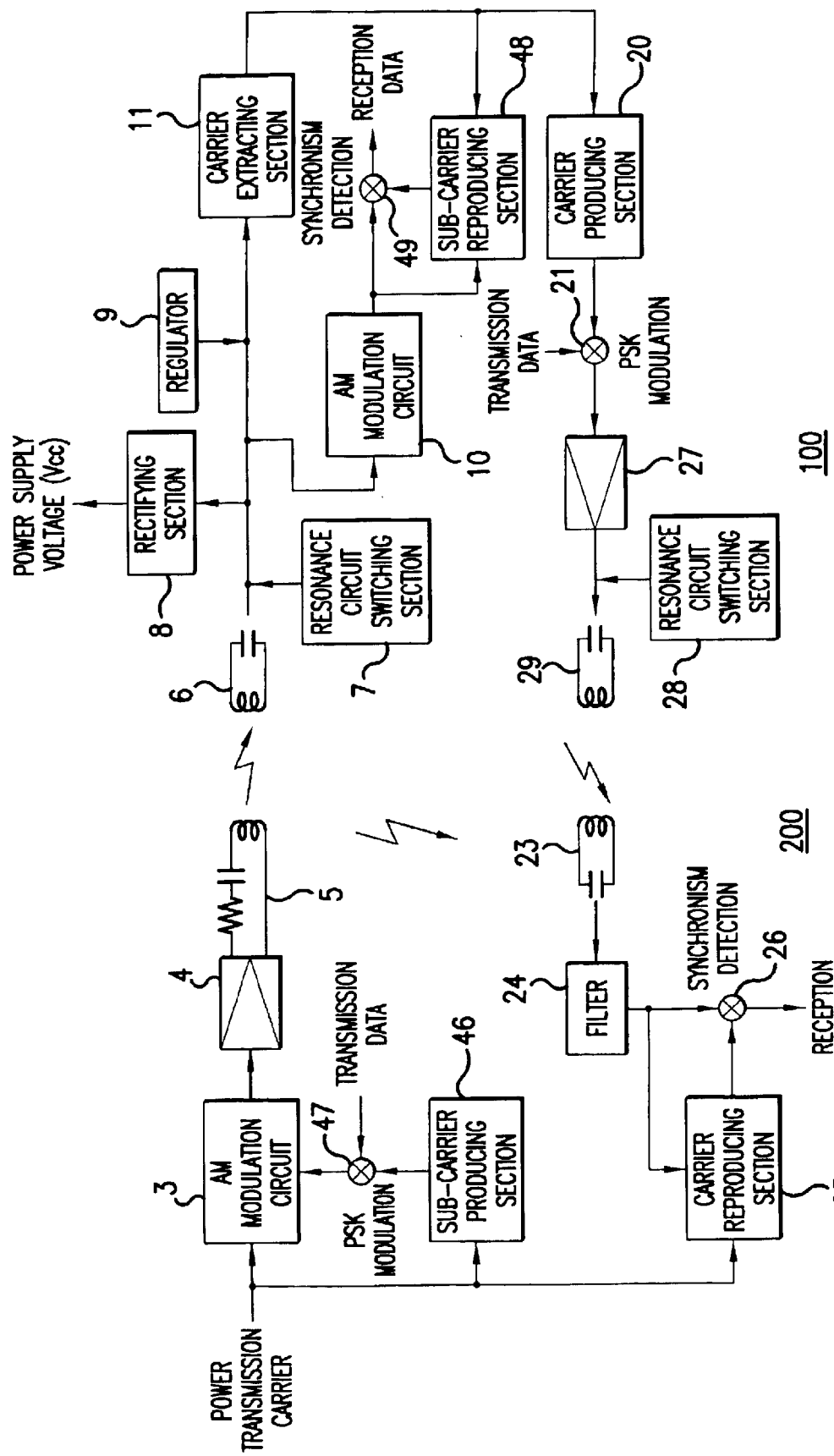
FIG. 35 is an illustration of still another configuration of the system according to the embodiment 9 of this invention.
Figure 36:
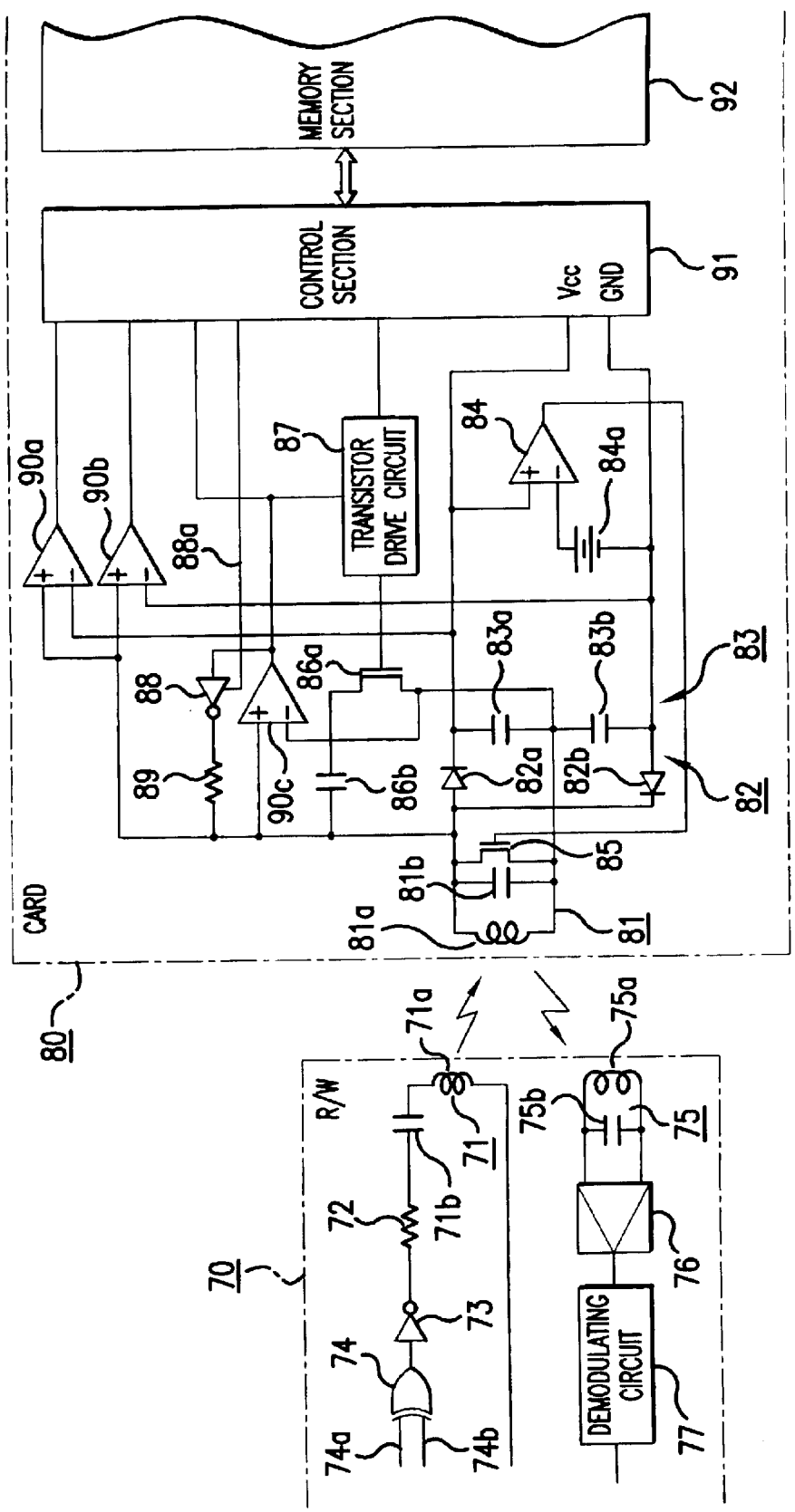
FIG. 36 is an illustration of a configuration of a conventional non-contact IC card system.
Figure 37:
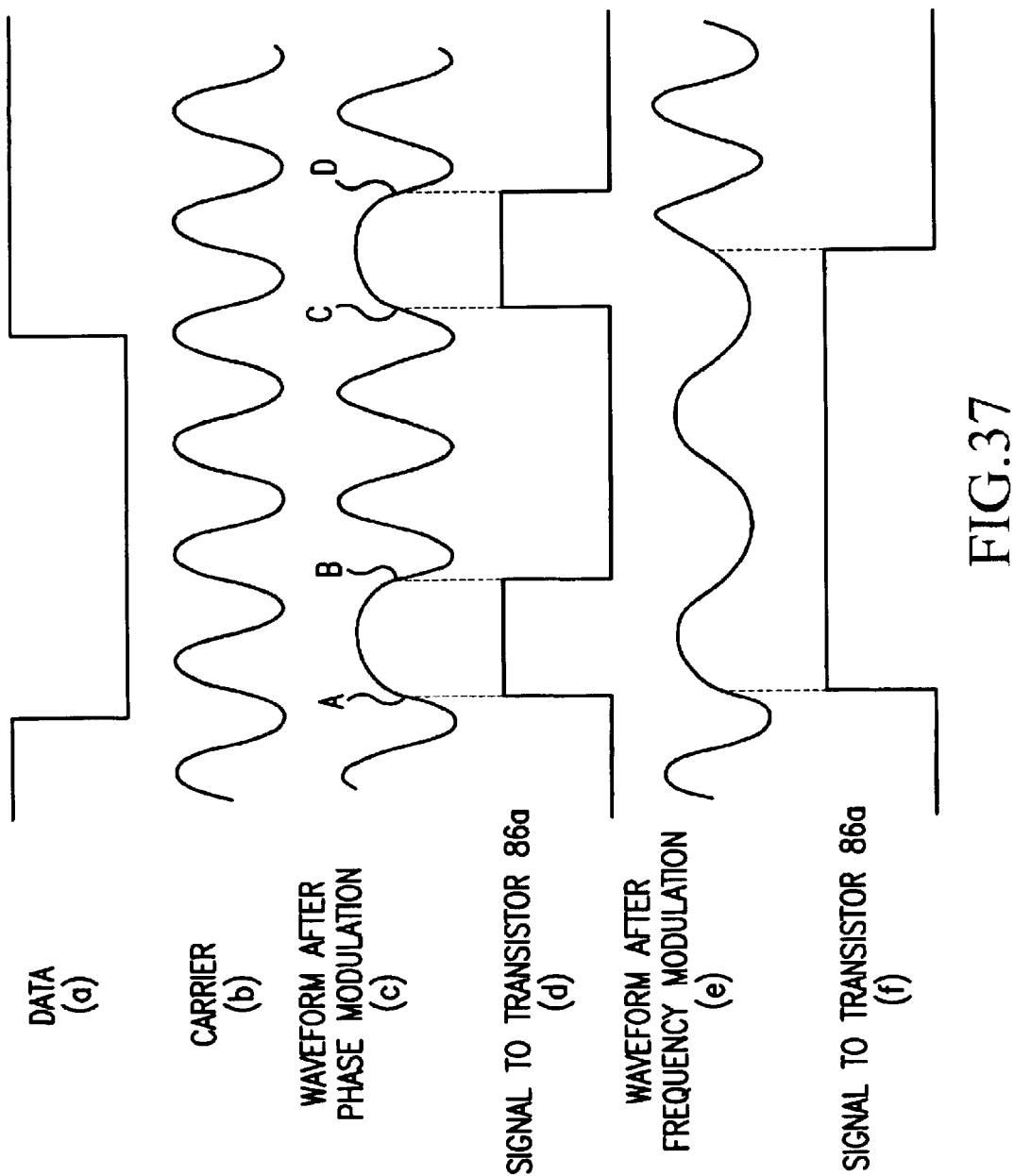
FIG. 37 is an illustration of waveforms for explaining an operation of the system in FIG. 36.

In addition, FIG. 34 shows a configuration in the case of using a sub-carrier in the systems according to the embodiments 2 and 3, shown in FIG. 10, and FIG. 35 illustrates a configuration in the case of employing a sub-carrier in the embodiments 4 and 5 shown in FIG. 16. In any case, the signal can assume a narrower band as compared with the case of the encoding; whereupon, the extraction becomes easy and the S/N ratio is improvable, which can lengthen the communication range.

Industrial Applicability

As described above, according to this invention, in a non-contact IC card system including an R/W and a non-contact IC card, the non-contact IC card comprises a regulator connected to both ends of a resonance circuit having an oscillation frequency identical with a frequency of a power transmission carrier for conducting reception of power and data from the R/W and transmission of data to the R/W, with said regulator stabilizing an operating voltage in the resonance circuit, and switching its characteristic in accordance with transmission data to produce a load variation for conducting data transmission by an AM modulation. Accordingly, it is possible to realize data transmission between the card and the R/W by the AM modulation based on the same frequency for the transmission and reception, and further to improve the data transmission rate and the communication range without considerably enlarging the frequency band of the signal to be used.

Furthermore, according to this invention, in a non-contact IC card system including an R/W and a non-contact IC card, the non-contact IC card comprises a regulator connected to both ends of a resonance circuit having an oscillation frequency identical with a frequency of a power transmission carrier to conduct reception of power and data from the R/W and transmission of data to the R/W, with the regulator adjusting a voltage across the resonance circuit and giving a directionality in accordance with transmission data in adjusting the voltage across the resonance circuit to conduct data transmission at a frequency different from the power transmission carrier, while the R/W comprises a data reception resonance circuit having a resonance frequency matching with a frequency for the data transmission from the card. Accordingly, since the power transmission carrier component is easily removable through a filter on the R/W side, the communication range is enlargeable and the rise in cost on the card side is suppressible.

Still furthermore, according to this invention, the regulator includes an adjusting section for adjusting the voltage across the resonance circuit and a pair of directionality designating sections for giving a directionality to this adjustment, and the pair of directionality designating sections are alternately operated in accordance with the transmission data so that the directionality is given to the adjustment, while the pair of directionality designating sections are operated simultaneously in accordance with the transmission data so that data transmission is conducted by an AM modulation. Accordingly, the construction becomes simple, and the data transmission becomes feasible in modes different according to the driving ways.

In addition, according to this invention, in addition to the aforesaid resonance circuit having the oscillation frequency identical with the frequency of the power transmission carrier for the reception of the power and data from the R/W and for the transmission of the data to the R/W, the non-contact IC card further comprises an additional data transmission resonance circuit having an oscillation frequency matching with the frequency for the data transmission, and this data transmission resonance circuit conducts the data transmission by obtaining transmission power from electromagnetic coupling with the resonance circuit having the oscillation frequency identical with the frequency of the power transmission carrier. Accordingly, the data transmission power is obtainable efficiently, and the data transmission strength is improvable, and further the long-distance communication becomes feasible.

Moreover, according to this invention, in a non-contact IC card system including an R/W and a non-contact IC card, the R/W comprises a transmission resonance circuit having a resonance frequency matching with a frequency of a power transmission carrier for conducting power transmission and data transmission and a data reception resonance circuit having a resonance frequency matching with a frequency for data transmission from the non-contact IC card, while the non-contact IC card comprises a reception resonance circuit having a resonance frequency matching with a frequency of the power transmission carrier for conducting reception of power and data from the R/W, a resonance circuit for data transmission to the R/W, having a resonance frequency different from the frequency of the power transmission carrier, and a driver connected to the data transmission resonance circuit and driven by a signal having a lower duty ratio than a transmission carrier for data transmission. Accordingly, since the duty of the signal for driving the driver is lower, which can cut the power consumption at the transmission.

Furthermore, according to this invention, in a non-contact IC card system including an R/W and a non-contact IC card, the R/W comprises a transmission resonance circuit having a resonance frequency matching with a frequency of a power transmission carrier for conducting power transmission and data transmission and a data reception resonance circuit having a resonance frequency matching with a frequency for data transmission from the non-contact IC card, while the non-contact IC card comprises a resonance circuit having a resonance frequency matching with a frequency of the power transmission carrier for conducting reception of power and data from the R/W and a data transmission resonance circuit having a resonance frequency different from the frequency of the power transmission carrier and made to obtain transmission power from electromagnetic coupling with the reception resonance circuit. Accordingly, the data transmission power is obtainable efficiently, and the data transmission strength is improvable, and further the long-distance communication is feasible.

Still furthermore, according to this invention, in a non-contact IC card system including an R/W and a non-contact IC card, the R/W comprises a transmission resonance circuit having a resonance frequency matching with a frequency of a power transmission carrier for power transmission and a data transmission/reception resonance circuit having a resonance frequency matching with a frequency for data transmission/reception to/from the non-contact IC card, while the non-contact IC card comprises a reception resonance circuit having a resonance frequency matching with a frequency of the power transmission carrier for conducting reception of power from the R/W and a data transmission/ reception resonance circuit having a resonance frequency different from the frequency of the power transmission carrier for conducting data transmission/reception to/from the R/W. Accordingly, the power transmission carrier component is removable on the card side, which enables the extension of the communication range.

Still furthermore, according to this invention, in a non-contact IC card system including an R/W and a non-contact IC card, at least one of the R/W and the non-contact IC card comprises an AM demodulating circuit for converting a reception signal being a carrier AM-modulated by transmission data into a binary signal by comparing the reception signal with a reference value and further for detecting the transmission data by comparing a pulse width of the converted binary signal with a width of a reference pulse feedbacked to vary in accordance with a variation of the pulse width of the converted binary signal. Accordingly, correct demodulation becomes possible and, hence, the extension of the communication range becomes feasible, and since the circuit can be constructed in the form of a logic circuit, the circuit can easily be made as an IC.

Still furthermore, according to this invention, in a non-contact IC card system including an R/W and a non-contact IC card, at least one of the R/W and the non-contact IC card comprises a filter for converting a reception signal including a plurality of carriers different in frequency from each other into a binary signal by comparing the reception signal with a reference value and further for extracting a carrier with a desired frequency by comparing a pulse width of the converted binary signal with a width of a reference pulse feedbacked to vary in accordance with a variation of the pulse width of the converted binary signal. Accordingly, it is possible to accurately separate a carrier with a desired frequency, thereby increasing the communication range. Additionally, since the circuit can be constructed in the form of a logic circuit, the circuit can easily be made as an IC.

In addition, according to this invention, a sub-carrier producing section is provided to divide a power transmission carrier from the R/W to the non-contact IC card to produce a sub-carrier having a different frequency, with the sub-carrier being modulated by transmission data. Accordingly, the signal has a narrower band as compared with the case of the encoding, so that the extraction becomes easy and the S/N ratio is improvable, thus extending the communication range.

Moreover, the non-contact IC card according to this invention can also offer similar effects.

What is claimed is:

1. A non-contact IC card system comprising:
a reader/writer and a non-contact IC card, wherein at least one of said reader/writer and said non-contact IC card includes:
an AM demodulating circuit for converting a reception signal being a carrier AM-modulated by transmission data into a binary signal by comparing said reception signal with a reference value and further for detecting said transmission data by comparing a pulse width of the converted binary signal with a width of a reference pulse feedbacked to vary in accordance with a variation of said pulse width of the converted binary signal.

2. A non-contact IC card system comprising:
a reader/writer and a non-contact IC card, wherein at least one of said reader/writer and said non-contact IC card includes:
a filter for converting a reception signal including a plurality of carriers different in frequency from each other into a binary signal by comparing said reception signal with a reference value and further for extracting a carrier with a desired frequency by comparing a pulse width of the converted binary signal with a width of a reference pulse feedbacked to vary in accordance with a variation of said pulse width of the converted binary signal.

3. A non-contact IC card which receives power supply from a reader/writer and conducts data transmission/reception to/from said reader/writer, comprising:
an AM demodulating circuit for converting a reception signal being a carrier AM-modulated by transmission data into a binary signal by comparing said reception signal with a reference value and further for detecting said transmission data by comparing a pulse width of the converted binary signal with a width of a reference pulse feedbacked to vary in accordance with a variation of said pulse width of the converted binary signal.

4. A non-contact IC card which receives power supply from a reader/writer and conducts data transmission/reception to/from the reader/writer, comprising:
a filter for converting a reception signal including a plurality of carriers different in frequency from each other into a binary signal by comparing said reception signal with a reference value and further for extracting a carrier with a desired frequency by comparing a pulse width of the converted binary signal with a width of a reference pulse feedbacked to vary in accordance with a variation of said pulse width of the converted binary signal.

* * * * *